US011963079B2

(12) United States Patent
Brault et al.

(10) Patent No.: US 11,963,079 B2
(45) Date of Patent: Apr. 16, 2024

(54) POWER TOOL WITH SHARED TERMINAL BLOCK

(71) Applicant: MILWAUKEE ELECTRIC TOOL CORPORATION, Brookfield, WI (US)

(72) Inventors: Richard P. Brault, Cedarburg, WI (US); Anthony Davis, Brookfield, WI (US); Steven M. Smith, Milwaukee, WI (US); Ben Gordon, Broomfield, WI (US); Amith J. Baskaran, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/307,105

(22) Filed: Apr. 26, 2023

(65) Prior Publication Data
US 2023/0262434 A1 Aug. 17, 2023

Related U.S. Application Data

(63) Continuation of application No. 16/782,432, filed on Feb. 5, 2020, now Pat. No. 11,665,519.
(Continued)

(51) Int. Cl.
*H04W 4/38* (2018.01)
*H01M 50/204* (2021.01)
(Continued)

(52) U.S. Cl.
CPC ........... *H04W 4/70* (2018.02); *H01M 50/204* (2021.01); *H01M 50/247* (2021.01); *H01M 50/296* (2021.01); *H01M 2220/30* (2013.01)

(58) Field of Classification Search
CPC ..... H04W 84/20; H04W 64/00; H04W 12/50; H04W 4/38; H04W 76/00
See application file for complete search history.

(56) References Cited

U.S. PATENT DOCUMENTS

| 1,990,035 A | 2/1935 | Franz et al. |
| 3,616,864 A | 11/1971 | Sorenson et al. |

(Continued)

FOREIGN PATENT DOCUMENTS

| CN | 1324125 A | 11/2001 |
| CN | 102983399 A | 3/2013 |

(Continued)

OTHER PUBLICATIONS

International Search Report and Written Opinion for Application No. PCT/US2018/045500 dated Dec. 6, 2018, 15 pages.
(Continued)

*Primary Examiner* — Tu X Nguyen
(74) *Attorney, Agent, or Firm* — Michael Best & Friedrich LLP

(57) ABSTRACT

An example power tool includes a battery pack receiving portion including a battery pack compartment including a battery pack support structure configured to receive and support a battery pack including battery terminals. The power tool further includes a terminal block located in the battery pack receiving portion and including tool terminals. At least two terminals of the tool terminals are configured to electrically and physically couple to the battery terminals. The power tool further includes an insertable device compartment located in the battery pack receiving portion and configured to receive an insertable wireless communication device including a first electronic processor, a transceiver, and device terminals. At least one device terminal is configured to electrically and physically couple to at least one shared terminal of the at least two terminals of the tool terminals. The insertable wireless communication device is configured to wirelessly communicate with an external device.

20 Claims, 18 Drawing Sheets

Related U.S. Application Data

(60) Provisional application No. 62/801,975, filed on Feb. 6, 2019.

(51) Int. Cl.
*H01M 50/247* (2021.01)
*H01M 50/296* (2021.01)
*H04W 4/70* (2018.01)

(56) References Cited

U.S. PATENT DOCUMENTS

| | | |
|---|---|---|
| 5,809,432 A | 9/1998 | Yamashita |
| 6,536,536 B1 | 3/2003 | Gass et al. |
| 6,607,041 B2 | 8/2003 | Suzuki et al. |
| 6,834,730 B2 | 12/2004 | Gass et al. |
| 6,872,121 B2 | 3/2005 | Wiesner et al. |
| 6,913,087 B1 | 7/2005 | Brotto et al. |
| 7,022,924 B2 | 4/2006 | Patton |
| 7,036,605 B2 | 5/2006 | Suzuki et al. |
| 7,093,668 B2 | 8/2006 | Gass et al. |
| 7,121,358 B2 | 10/2006 | Gass et al. |
| 7,146,667 B2 | 12/2006 | Elsener |
| 7,237,990 B2 | 7/2007 | Deng |
| 7,253,736 B2 | 8/2007 | Tethrake et al. |
| 7,256,699 B2 | 8/2007 | Tethrake et al. |
| 7,298,240 B2 | 11/2007 | Lamar |
| 7,311,025 B1 | 12/2007 | Wilson, Jr. |
| 7,328,752 B2 | 2/2008 | Gass et al. |
| 7,373,681 B2 | 5/2008 | Elsener |
| 7,513,179 B2 | 4/2009 | Wilson, Jr. |
| 7,540,334 B2 | 6/2009 | Gass et al. |
| 7,608,790 B2 | 10/2009 | Patton |
| RE41,160 E | 3/2010 | Gilmore et al. |
| RE41,185 E | 3/2010 | Gilmore et al. |
| 7,784,104 B2 | 8/2010 | Innami et al. |
| 7,827,718 B2 | 11/2010 | Luebkert et al. |
| 7,837,694 B2 | 11/2010 | Tethrake et al. |
| 7,850,071 B2 | 12/2010 | Sakamoto et al. |
| 7,887,559 B2 | 2/2011 | Deng et al. |
| 7,896,098 B2 | 3/2011 | Suzuki et al. |
| 7,942,084 B2 | 5/2011 | Wilson, Jr. et al. |
| 7,969,116 B2 | 6/2011 | Aradachi et al. |
| 8,035,487 B2 | 10/2011 | Malackowski |
| 8,062,060 B2 | 11/2011 | Rejman |
| 8,066,533 B2 | 11/2011 | Tomita et al. |
| 8,113,066 B2 | 2/2012 | Eckstein et al. |
| 8,115,621 B2 | 2/2012 | Rajala et al. |
| 8,157,826 B2 | 4/2012 | Deng et al. |
| 8,169,298 B2 | 5/2012 | Wiesner et al. |
| 8,189,043 B2 | 5/2012 | Schneider et al. |
| 8,200,354 B2 | 6/2012 | Freeman et al. |
| 8,210,275 B2 | 7/2012 | Suzuki et al. |
| 8,251,157 B2 | 8/2012 | Gray et al. |
| 8,253,559 B2 | 8/2012 | Howard et al. |
| 8,253,560 B2 | 8/2012 | Howard et al. |
| 8,254,878 B2 | 8/2012 | Howard et al. |
| 8,264,374 B2 | 9/2012 | Obutake et al. |
| 8,274,273 B2 | 9/2012 | Nguyen et al. |
| 8,285,248 B2 | 10/2012 | Howard et al. |
| 8,406,697 B2 | 3/2013 | Arimura et al. |
| 8,412,179 B2 | 4/2013 | Gerold et al. |
| 8,418,778 B2 | 4/2013 | Eshleman et al. |
| 8,454,613 B2 | 6/2013 | Tethrake et al. |
| 8,500,769 B2 | 8/2013 | Deng |
| 8,535,342 B2 | 9/2013 | Malackowski et al. |
| 8,555,755 B2 | 10/2013 | Cattaneo |
| 8,588,806 B2 | 11/2013 | Howard et al. |
| 8,624,721 B2 | 1/2014 | Barker, Jr. et al. |
| 8,630,729 B2 | 1/2014 | Freeman et al. |
| 8,659,652 B2 | 2/2014 | Schneider et al. |
| 8,666,936 B2 | 3/2014 | Wallace |
| 8,686,831 B2 | 4/2014 | Fgreen et al. |
| 8,764,466 B2 | 7/2014 | Million |
| 8,766,798 B2 | 7/2014 | Howard et al. |
| 8,768,381 B2 | 7/2014 | Howard et al. |
| 8,776,644 B2 | 7/2014 | Harper et al. |
| 8,792,598 B1 | 7/2014 | Cendrillon et al. |
| 8,847,754 B2 | 9/2014 | Buchheim et al. |
| 8,847,755 B2 | 9/2014 | Howard et al. |
| 8,851,200 B2 | 10/2014 | Gray et al. |
| 8,870,078 B2 | 10/2014 | Webb et al. |
| 8,878,671 B2 | 11/2014 | Buchheim et al. |
| 8,884,756 B2 | 11/2014 | Howard et al. |
| 8,884,871 B2 | 11/2014 | Howard et al. |
| 8,890,686 B2 | 11/2014 | Howard et al. |
| 8,896,457 B2 | 11/2014 | Howard et al. |
| 8,928,463 B2 | 1/2015 | Landau et al. |
| 8,938,315 B2 | 1/2015 | Freeman et al. |
| 8,981,952 B2 | 3/2015 | Howard et al. |
| 8,988,522 B2 | 3/2015 | Schneider et al. |
| 9,041,528 B2 | 5/2015 | Howard et al. |
| 9,049,641 B2 | 6/2015 | Wible et al. |
| 9,078,481 B2 | 7/2015 | Howard et al. |
| 9,082,277 B2 | 7/2015 | Howard et al. |
| 9,089,952 B2 | 7/2015 | Gatling et al. |
| 9,129,499 B2 | 9/2015 | Howard et al. |
| 9,189,663 B2 | 11/2015 | Goren et al. |
| 9,196,881 B2 | 11/2015 | Gray et al. |
| 9,232,357 B2 | 1/2016 | Buchheim et al. |
| 9,256,988 B2 | 2/2016 | Wenger et al. |
| 9,295,024 B2 | 3/2016 | Howard et al. |
| 9,367,062 B2 | 6/2016 | Volpert |
| 9,392,404 B2 | 7/2016 | Daoura et al. |
| 9,430,928 B2 | 8/2016 | Keda et al. |
| 9,449,268 B2 | 9/2016 | Goren et al. |
| 9,466,198 B2 | 10/2016 | Burch et al. |
| 9,467,862 B2 | 10/2016 | Zeiler et al. |
| 9,491,578 B1 | 11/2016 | Saucedo |
| 9,495,847 B2 | 11/2016 | Howard et al. |
| 9,501,883 B2 | 11/2016 | Handville et al. |
| 9,537,335 B2 | 1/2017 | Furui et al. |
| 9,547,965 B2 | 1/2017 | Goren et al. |
| 9,564,774 B2 | 2/2017 | Daoura et al. |
| 9,576,235 B2 | 2/2017 | Kim et al. |
| 9,577,450 B2 | 2/2017 | Yoshikawa et al. |
| 9,595,839 B2 | 3/2017 | Furui et al. |
| 9,626,851 B2 | 4/2017 | Xi et al. |
| 9,639,722 B2 | 5/2017 | Landau et al. |
| 9,664,808 B2 | 5/2017 | Nguyen et al. |
| 9,672,708 B2 | 6/2017 | Goren et al. |
| 9,693,024 B2 | 6/2017 | Schneider et al. |
| 9,707,026 B2 | 7/2017 | Malackowski et al. |
| 9,711,017 B2 | 7/2017 | Howard et al. |
| 9,713,116 B2 | 7/2017 | Wible et al. |
| 9,715,807 B2 | 7/2017 | Howard |
| 9,756,402 B2 | 9/2017 | Stampfl et al. |
| 9,759,402 B2 | 9/2017 | Stampfl et al. |
| 9,779,601 B2 | 10/2017 | Goren et al. |
| 9,780,583 B2 | 10/2017 | Furui et al. |
| 9,819,132 B2 | 11/2017 | Peloquin et al. |
| 9,833,890 B2 | 12/2017 | Ito et al. |
| 9,875,629 B2 | 1/2018 | Goren et al. |
| 9,888,300 B2 | 2/2018 | Stampfl et al. |
| 9,892,626 B2 | 2/2018 | Daoura et al. |
| 9,908,182 B2 | 3/2018 | Phillips et al. |
| 9,916,739 B2 | 3/2018 | Suzuki |
| 9,942,700 B2 | 4/2018 | Howard et al. |
| 9,943,746 B2 | 4/2018 | Kennard et al. |
| 9,955,993 B2 | 5/2018 | Deng |
| 9,967,713 B2 | 5/2018 | Buchheim et al. |
| 9,973,831 B2 | 5/2018 | Mejegard et al. |
| 9,979,149 B2 | 5/2018 | Peloquin et al. |
| 9,986,212 B2 | 5/2018 | Schneider et al. |
| 10,022,853 B1 | 7/2018 | Mollica |
| 10,049,549 B2 | 8/2018 | Howard |
| 10,051,910 B2 | 8/2018 | Howard et al. |
| 10,074,049 B2 | 9/2018 | Daoura et al. |
| 10,090,692 B2 | 10/2018 | Yoshikawa et al. |
| 10,123,161 B2 | 11/2018 | Howard et al. |
| 10,124,455 B2 | 11/2018 | Ito et al. |
| 10,131,042 B2 | 11/2018 | Mergener et al. |
| 10,131,043 B2 | 11/2018 | Mergener et al. |
| 10,136,198 B2 | 11/2018 | Stampfl et al. |
| 10,213,908 B2 | 2/2019 | Mergener et al. |

(56) References Cited

U.S. PATENT DOCUMENTS

| | | | |
|---|---|---|---|
| 10,277,964 B2 | 4/2019 | Stampfl et al. |
| 10,295,990 B2 | 5/2019 | Dey, IV et al. |
| 10,322,522 B2 | 6/2019 | DeCicco et al. |
| 10,354,181 B2 | 7/2019 | Freienstein et al. |
| 10,368,186 B2 | 7/2019 | Stampfl et al. |
| 10,380,883 B2 | 8/2019 | Matson et al. |
| 10,391,622 B2 | 8/2019 | Tanaka et al. |
| 10,396,573 B2 | 8/2019 | Furui et al. |
| 10,398,032 B1 | 8/2019 | Bailey et al. |
| 10,424,189 B2 | 9/2019 | Daoura et al. |
| 10,431,064 B2 | 10/2019 | Howard |
| 10,440,501 B2 | 10/2019 | Howard et al. |
| D867,909 S | 11/2019 | Kachar |
| 10,510,199 B2 | 12/2019 | Hoossainy et al. |
| 10,516,920 B2 | 12/2019 | Stampfl et al. |
| 10,518,343 B2 | 12/2019 | Ogino et al. |
| 10,569,398 B2 | 2/2020 | Mergener et al. |
| 11,085,582 B2 | 8/2021 | Mergener et al. |
| 11,212,909 B2 | 12/2021 | Smith et al. |
| 2002/0110431 A1 | 8/2002 | Dils et al. |
| 2003/0090239 A1 | 5/2003 | Sakakibara |
| 2003/0093103 A1 | 5/2003 | Malackowski et al. |
| 2004/0108120 A1 | 6/2004 | Wiesner et al. |
| 2004/0135692 A1 | 7/2004 | Below et al. |
| 2004/0198382 A1 | 10/2004 | Hammond |
| 2005/0075149 A1 | 4/2005 | Gerber et al. |
| 2005/0173142 A1 | 8/2005 | Cutler et al. |
| 2005/0197093 A1 | 9/2005 | Wiklof et al. |
| 2005/0267988 A1 | 12/2005 | Ferguson et al. |
| 2006/0179473 A1 | 8/2006 | Innami et al. |
| 2008/0125040 A1 | 5/2008 | Kalayjian |
| 2008/0135272 A1 | 6/2008 | Wallgren |
| 2008/0177267 A1 | 7/2008 | Sands et al. |
| 2008/0196910 A1 | 8/2008 | Radle et al. |
| 2008/0238609 A1 | 10/2008 | Wiesner et al. |
| 2008/0252446 A1 | 10/2008 | Dammertz |
| 2008/0269031 A1 | 10/2008 | Lee et al. |
| 2009/0145187 A1 | 6/2009 | Deppner et al. |
| 2009/0251330 A1 | 10/2009 | Gerold et al. |
| 2010/0096151 A1 | 4/2010 | Ostling |
| 2010/0186976 A1 | 7/2010 | Tsubakimoto et al. |
| 2010/0265097 A1 | 10/2010 | Obatake et al. |
| 2010/0295747 A1 | 11/2010 | Zeltser et al. |
| 2011/0003504 A1 | 1/2011 | Rejman |
| 2011/0073343 A1 | 3/2011 | Sawano et al. |
| 2011/0253402 A1 | 10/2011 | Aradachi et al. |
| 2012/0169485 A1 | 7/2012 | Eckert |
| 2012/0292070 A1 | 11/2012 | Ito et al. |
| 2012/0304367 A1 | 12/2012 | Howard et al. |
| 2013/0109375 A1 | 5/2013 | Zeiler et al. |
| 2013/0256349 A1 | 10/2013 | Styth et al. |
| 2013/0267247 A1 | 10/2013 | Wible et al. |
| 2013/0295426 A1 | 11/2013 | Halavart et al. |
| 2013/0296910 A1 | 11/2013 | Deng |
| 2013/0313925 A1 | 11/2013 | Mergener et al. |
| 2013/0344885 A1 | 12/2013 | Parisi et al. |
| 2014/0031831 A1 | 1/2014 | Malackowski et al. |
| 2014/0070924 A1 | 3/2014 | Wenger et al. |
| 2014/0132411 A1 | 5/2014 | Buchheim et al. |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0180464 A1 | 6/2014 | Koerber |
| 2014/0184397 A1 | 7/2014 | Volpert |
| 2014/0240125 A1 | 8/2014 | Burch et al. |
| 2014/0262391 A1 | 9/2014 | Eardley |
| 2014/0326477 A1 | 11/2014 | Thorson et al. |
| 2014/0367134 A1 | 12/2014 | Phillips et al. |
| 2015/0054627 A1 | 2/2015 | Landau et al. |
| 2015/0133170 A1 | 5/2015 | Buchheim et al. |
| 2015/0195807 A1 | 7/2015 | Wible et al. |
| 2015/0197093 A1 | 7/2015 | Berry et al. |
| 2015/0219257 A1 | 8/2015 | Harper et al. |
| 2015/0286209 A1 | 10/2015 | Kreuzer et al. |
| 2015/0316913 A1 | 11/2015 | Rickey et al. |
| 2015/0340921 A1 | 11/2015 | Suda et al. |
| 2015/0356861 A1 | 12/2015 | Daoura et al. |
| 2016/0019512 A1 | 1/2016 | Buchheim et al. |
| 2016/0048122 A1 | 2/2016 | Lukosz et al. |
| 2016/0171788 A1 | 6/2016 | Wenger et al. |
| 2016/0226132 A1 | 8/2016 | Kim et al. |
| 2016/0311094 A1 | 10/2016 | Mergener et al. |
| 2016/0325391 A1 | 11/2016 | Stampfl et al. |
| 2016/0342151 A1 | 11/2016 | Dey, IV et al. |
| 2017/0008159 A1 | 1/2017 | Boeck et al. |
| 2017/0083014 A1 | 3/2017 | Conrad et al. |
| 2017/0201295 A1 | 7/2017 | Kusakawa |
| 2017/0201853 A1 | 7/2017 | Chen et al. |
| 2017/0216986 A1 | 8/2017 | Dey, IV et al. |
| 2017/0222382 A1* | 8/2017 | Peloquin ............... H01R 27/02 |
| 2017/0259422 A1 | 9/2017 | Takeyama et al. |
| 2017/0303984 A1 | 10/2017 | Malackowski |
| 2017/0343966 A1 | 11/2017 | Schadow et al. |
| 2018/0071907 A1 | 3/2018 | Myhill |
| 2018/0076639 A1 | 3/2018 | Furui et al. |
| 2018/0104802 A1 | 4/2018 | Mergener et al. |
| 2018/0114423 A1 | 4/2018 | Goren et al. |
| 2018/0126537 A1 | 5/2018 | Tanaka et al. |
| 2018/0133873 A1 | 5/2018 | Mergener et al. |
| 2018/0154456 A1 | 6/2018 | Phillips et al. |
| 2018/0199955 A1 | 7/2018 | Deng |
| 2018/0212377 A1 | 7/2018 | Zimmermann et al. |
| 2018/0302753 A1 | 10/2018 | Langton |
| 2018/0319003 A1 | 11/2018 | Freienstein et al. |
| 2018/0322376 A1 | 11/2018 | Henry et al. |
| 2018/0345474 A1 | 12/2018 | Brennenstuhl et al. |
| 2018/0354118 A1 | 12/2018 | Brennenstuhl et al. |
| 2018/0357523 A1 | 12/2018 | Freienstein et al. |
| 2019/0026619 A1 | 1/2019 | Cecchin et al. |
| 2019/0027002 A1 | 1/2019 | Esenwein et al. |
| 2019/0043292 A1 | 2/2019 | Hoossainy et al. |
| 2019/0103012 A1 | 4/2019 | Daoura et al. |
| 2019/0160646 A1 | 5/2019 | Hoossainy et al. |
| 2019/0173349 A1 | 6/2019 | Smith et al. |
| 2019/0215584 A1 | 7/2019 | Stampfl et al. |
| 2019/0219990 A1 | 7/2019 | Dey, IV et al. |
| 2019/0298122 A1 | 10/2019 | Tahara et al. |
| 2019/0299386 A1 | 10/2019 | Tanaka et al. |
| 2019/0334357 A1 | 10/2019 | Furui et al. |
| 2020/0094393 A1 | 3/2020 | Schadow et al. |

FOREIGN PATENT DOCUMENTS

| | | |
|---|---|---|
| CN | 103579741 A | 2/2014 |
| CN | 203956880 U | 11/2014 |
| CN | 107877457 A | 4/2018 |
| DE | 8102453 U1 | 9/1982 |
| DE | 10238710 A1 | 3/2003 |
| DE | 202004020457 U1 | 6/2005 |
| DE | 202005010622 U1 | 11/2006 |
| DE | 102005053821 A1 | 5/2007 |
| DE | 102006046801 A1 | 4/2008 |
| DE | 202008012687 U1 | 12/2008 |
| DE | 102010041278 A1 | 3/2012 |
| DE | 102011050393 A1 | 11/2012 |
| DE | 102011089499 A1 | 6/2013 |
| DE | 102012105483 A1 | 12/2013 |
| DE | 202014006084 U1 | 8/2014 |
| DE | 102015226734 A1 | 6/2017 |
| DE | 102016211937 A1 | 1/2018 |
| EP | 1270150 A2 | 1/2003 |
| EP | 1291999 A1 | 3/2003 |
| EP | 1690648 A2 | 8/2006 |
| EP | 1781074 A2 | 5/2007 |
| EP | 2072192 A1 | 6/2009 |
| EP | 2581168 A1 | 4/2013 |
| EP | 2628427 A2 | 8/2013 |
| EP | 3200313 A1 | 6/2017 |
| EP | 3272467 A1 | 1/2018 |
| JP | 2010194662 A | 9/2010 |
| JP | 2019171523 A | 10/2019 |
| KR | 1020180108895 A | 10/2018 |
| WO | 2007058596 A1 | 5/2007 |
| WO | 2012035815 A1 | 3/2012 |

(56) References Cited

FOREIGN PATENT DOCUMENTS

| | | |
|---|---|---|
| WO | 2012035854 A1 | 3/2012 |
| WO | 2013014914 A2 | 1/2013 |
| WO | 2013112469 A1 | 8/2013 |
| WO | 2013116303 A1 | 8/2013 |
| WO | 2013136917 A1 | 9/2013 |
| WO | 2015061370 A1 | 4/2015 |
| WO | 2016206859 A1 | 12/2016 |
| WO | 2016206860 A1 | 12/2016 |
| WO | 2017089100 A1 | 6/2017 |
| WO | 2017089452 A1 | 6/2017 |
| WO | 2017093160 A1 | 6/2017 |
| WO | 2017151954 A1 | 9/2017 |
| WO | 2018024637 A1 | 2/2018 |
| WO | 2018162233 A1 | 9/2018 |
| WO | 2018177669 A1 | 10/2018 |
| WO | 2018177671 A1 | 10/2018 |
| WO | 2019115434 A1 | 6/2019 |

OTHER PUBLICATIONS

Pixie 2.0 User Guide, 6 pages, accessed Jan. 31, 2019.
Pixie, <https://getpixie.com> webpage accessed Jan. 31, 2019.
International Search Report and Written Opinion for Application No. PCT/US2018/062803 dated Mar. 19, 2019, 12 pages.
United States Patent Office Notice of Allowance for U.S. Appl. No. 16/056,710 dated Aug. 16, 2019 (8 pages).
International Preliminary Report on Patentability for Application No. PCT/US2018/045500 dated Feb. 11, 2020 (13 pages).
International Search Report and Written Opinion for Application No. PCT/US2020/016752 dated Jun. 5, 2020 (13 pages).

\* cited by examiner

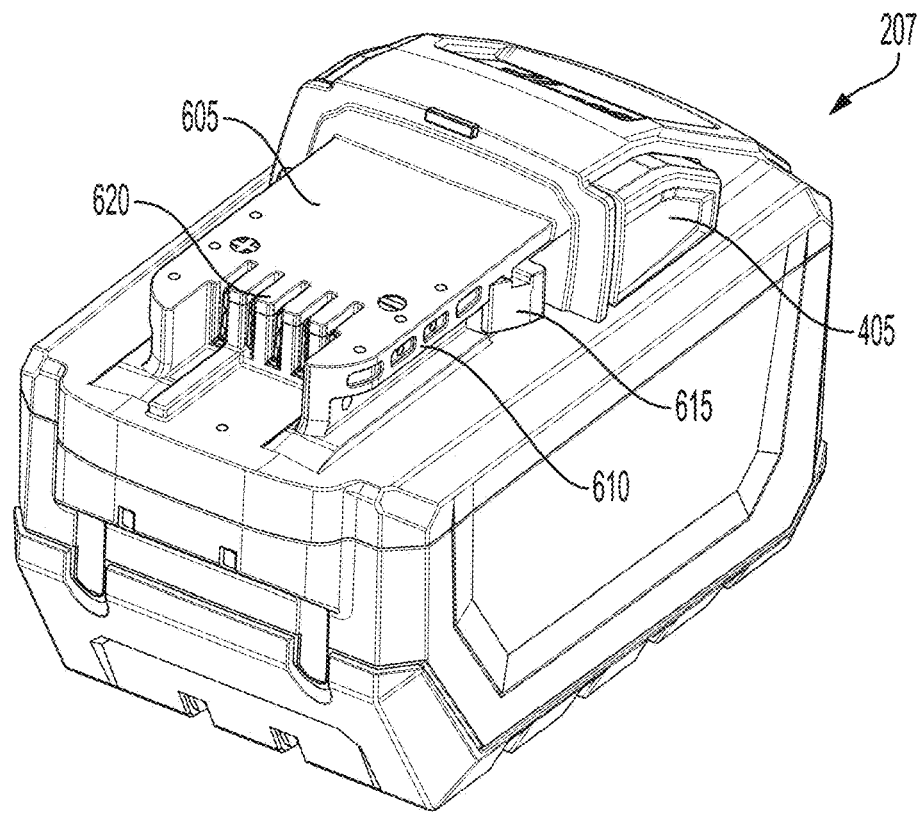
FIG. 6
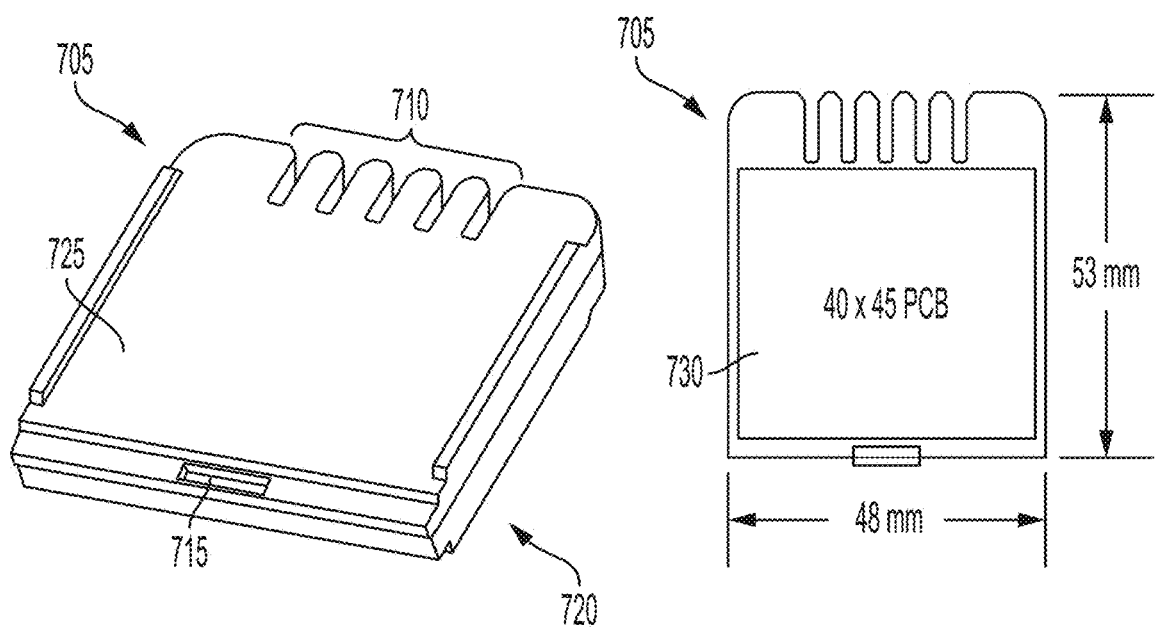
FIG. 7A
FIG. 7B

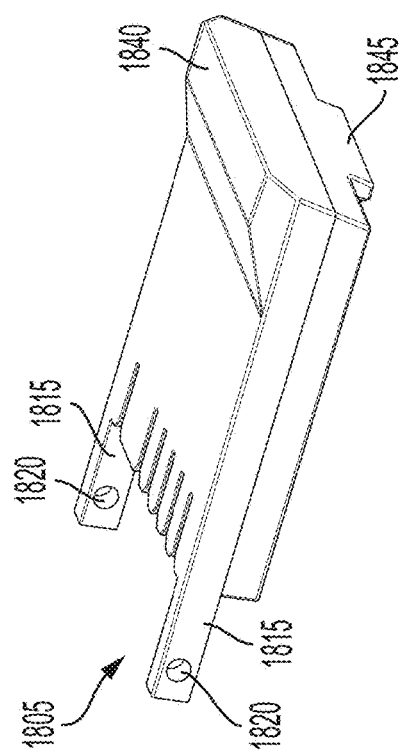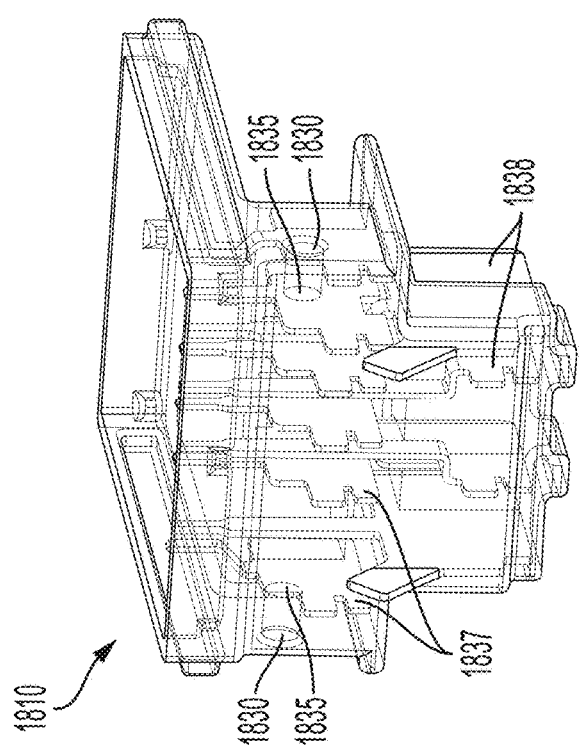

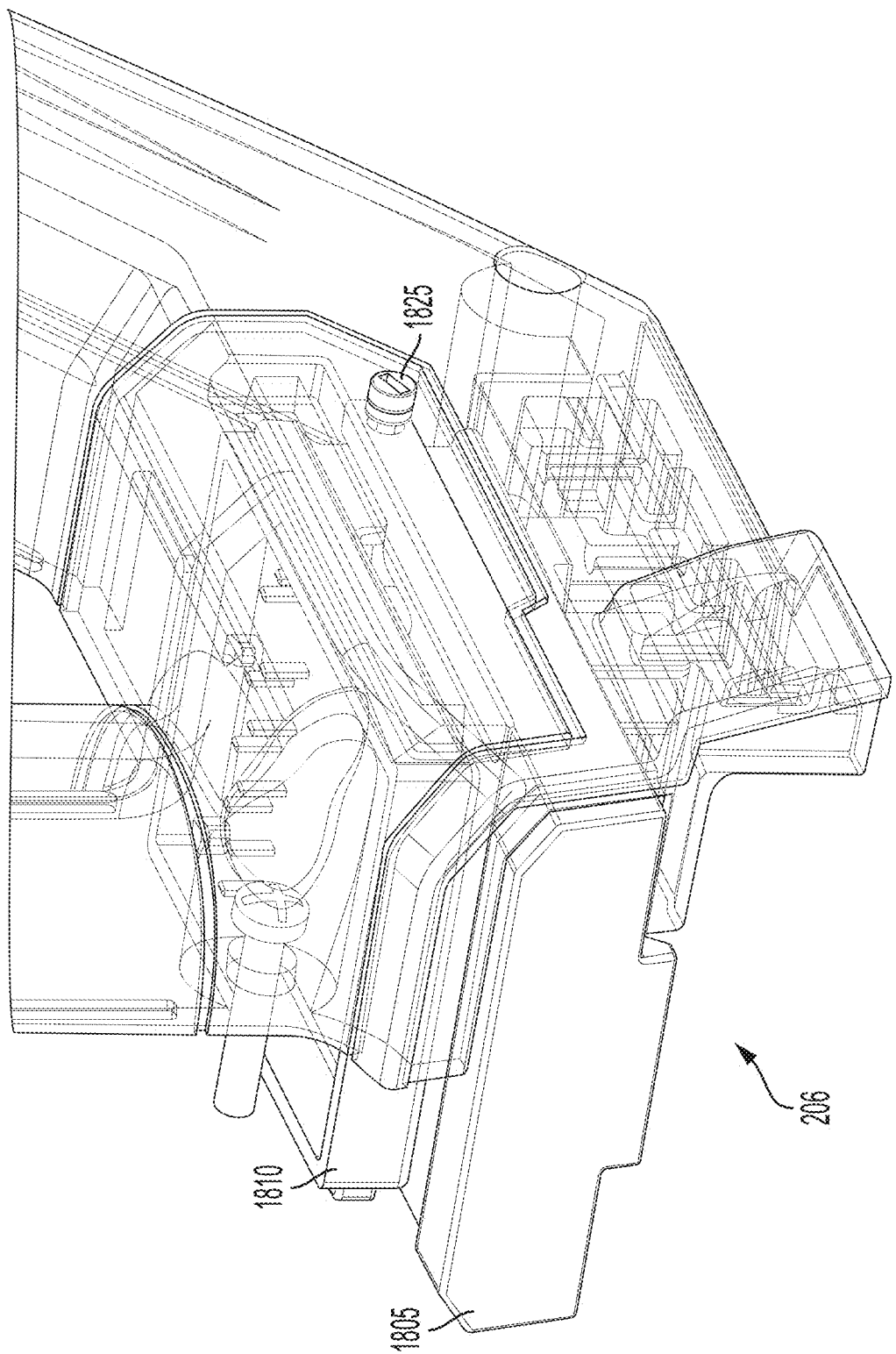

POWER TOOL WITH SHARED TERMINAL BLOCK

RELATED APPLICATIONS

This application is a continuation of U.S. patent application Ser. No. 16/782,432, filed Feb. 5, 2020, which claims priority to U.S. Provisional Application No. 62/801,975, filed on Feb. 6, 2019, the entire contents of each of which are hereby incorporated by reference.

FIELD OF THE INVENTION

The present invention relates to power tools with a compartment for receiving another device.

SUMMARY

One embodiment includes a power tool including a housing having a motor housing portion, a handle portion, and a battery pack receiving portion. The battery pack receiving portion may include a battery pack compartment including a battery pack support structure configured to receive and support a battery pack including battery terminals. The power tool may further include a motor within the motor housing portion and having a rotor and a stator. The power tool may further include a terminal block located in the battery pack receiving portion and including tool terminals. At least two terminals of the tool terminals may be configured to electrically and physically couple to the battery terminals. The power tool may further include an insertable device compartment located in the battery pack receiving portion. The power tool may further include an insertable wireless communication device including a first electronic processor and a transceiver. The insertable wireless communication device may be configured to be received in the insertable device compartment and may include device terminals. At least one device terminal may be configured to electrically and physically couple to at least one shared terminal of the at least two terminals of the tool terminals. The insertable wireless communication device may be configured to wirelessly communicate with an external device. The power tool may further include a second electronic processor within the housing and configured to control operation of the motor, and communicate with the first electronic processor when the insertable wireless communication device is inserted into the insertable device compartment to allow information to be transferred between the second electronic processor and the external device.

In some embodiments, the first electronic processor of the insertable wireless communication device is configured to at least one of the group of: (i) receive power tool data from the second electronic processor of the power tool and transmit the power tool data to the external device; and (ii) receive power tool configuration data from the external device and transmit the power tool configuration data to the second electronic processor of the power tool.

Another embodiment includes a power tool including a housing having a motor housing portion, a handle portion, and a battery pack receiving portion. The battery pack receiving portion may include a terminal block including tool terminals. The battery pack receiving portion may further include a battery pack compartment including a battery pack support structure configured to receive and support a battery pack. The battery pack may include battery terminals configured to physically and electrically connect to a first selection of at least two terminals of the tool terminals. The battery pack receiving portion may further include an insertable device compartment configured to receive and support an insertable wireless communication device. The insertable wireless communication device may include device terminals configured to physically and electrically connect to a second selection of at least two terminals of the tool terminals.

In some embodiments, the first selection of the least two terminals of the tool terminals that are configured to be physically and electrically connected to the battery terminals of the battery pack are the same as the second selection of the at least two terminals of the tool terminals that are configured to be physically and electrically connected to the device terminals of the insertable wireless communication device.

In some embodiments, the insertable wireless communication device has a height of less than approximately twenty-five millimeters.

In some embodiments, the first selection of the at least two terminals of the tool terminals that are configured to be physically and electrically connected to the battery terminals of the battery pack extend from the terminal block through the insertable device compartment and into the battery pack compartment. In some embodiments, the first selection of the at least two terminals of the tool terminals that extend from the terminal block through the insertable device compartment and into the battery pack compartment are configured to be physically and electrically connected to at least one of the group consisting of the device terminals and the battery terminals.

In some embodiments, at least one terminal of the tool terminals extends from the terminal block into the insertable device compartment without extending into the battery pack compartment, and the at least one terminal is configured to be physically and electrically connected to the device terminals and not the battery terminals.

Another embodiment includes a method of operating a power tool. The method may include receiving and supporting an insertable wireless communication device in an insertable device compartment of a battery pack receiving portion of the power tool that includes a housing having a motor housing portion, a handle portion, and the battery pack receiving portion. The insertable wireless communication device may include device terminals configured to physically and electrically connect to shared tool terminals of a terminal block included in the battery pack receiving portion. The method may further include receiving and supporting a battery pack in a battery pack compartment of the battery pack receiving portion. The battery pack may include battery terminals configured to physically and electrically connect to the shared tool terminals. The method may further include receiving, by the power tool, power from the battery pack via at least two of the shared tool terminals. The method may further include receiving, by the insertable wireless communication device, power from the battery pack via the at least two of the shared tool terminals.

Other aspects of the invention will become apparent by consideration of the detailed description and accompanying drawings.

BRIEF DESCRIPTION OF THE DRAWINGS

FIG. 6 is a perspective view of a battery pack that is attachable to the power tool of FIG. 3 according to one example embodiment.

FIG. 7A is a perspective view of an insertable wireless communication device according to one example embodiment.

FIG. 7B is a top view of the insertable wireless communication device of FIG. 7A with an upper portion of a housing removed according to one example embodiment.

FIG. 18A is a perspective view of an insertable wireless communication device according to another example embodiment FIG. 18B is a perspective view of a terminal block of the power tool of FIG. 3 according to another example embodiment with the outer walls of the terminal block shown partially transparently.

FIG. 18C is a perspective view of the battery pack receiving portion of the power tool of FIG. 3 according to another example embodiment with part of the housing removed and part of the housing shown partially transparently.

DETAILED DESCRIPTION

Figure 1:
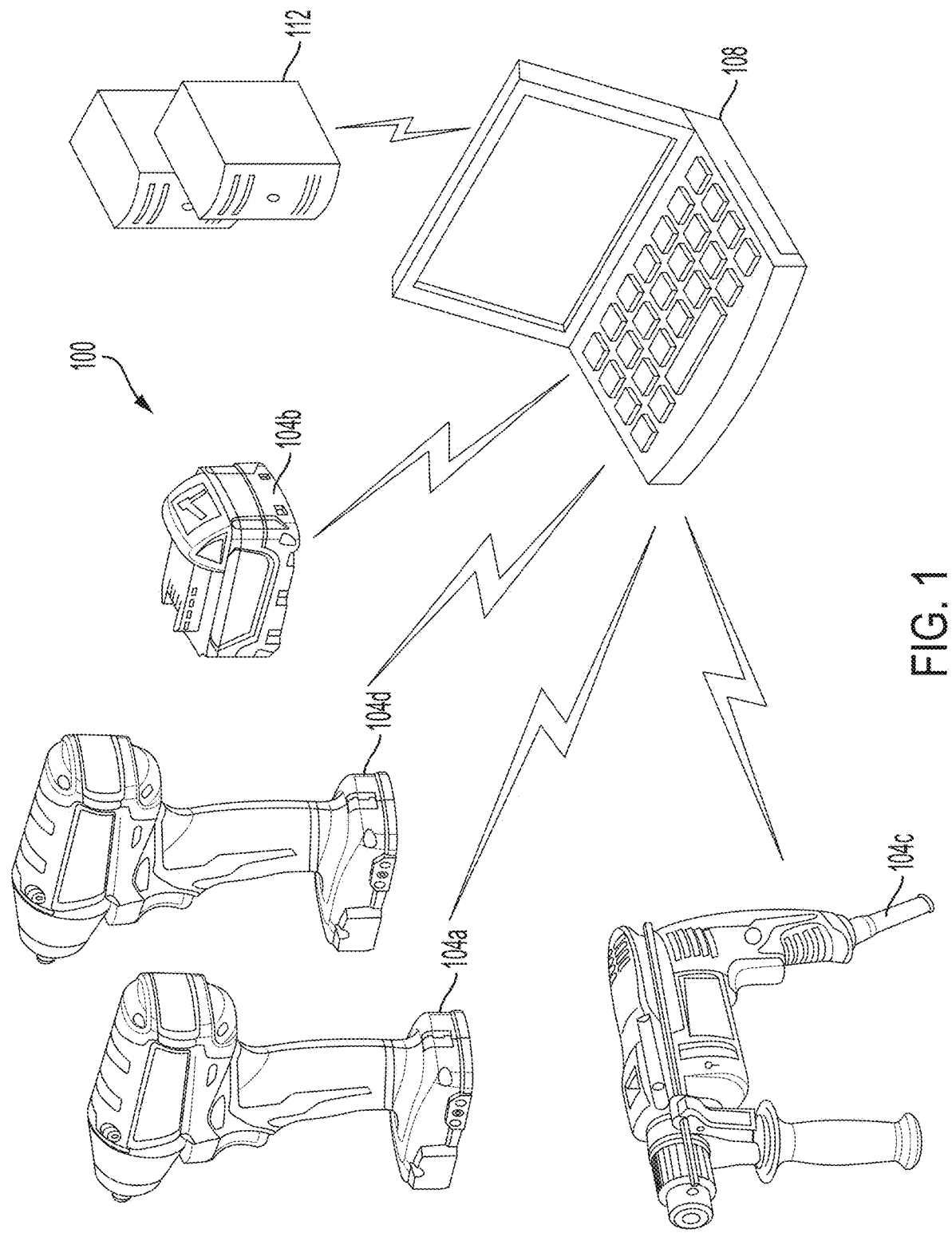
FIG. 1 illustrates a communication system according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Throughout this application, the term "approximately" is used to describe the dimensions of various components. In some situations, the term "approximately" means that the described dimension is within 1% of the stated value, within 5% of the stated value, within 10% of the stated value, or the like. When the term "and/or" is used in this application, it is intended to include any combination of the listed components. For example, if a component includes A and/or B, the component may include solely A, solely B, or A and B.

FIG. 1 illustrates a communication system 100. The communication system 100 includes power tool devices 104a, 104b, 104c, and 104d, each generically referred to as the power tool 104, and an external device 108. The power tool devices 104a, 104b, 104c, 104d each include a wireless communication controller to enable wireless communication between the power tool 104 and the external device 108 while they are within a communication range of each other. Some of the power tool devices 104d include the wireless communication device integrated into the power tool device 104d such that insertion or removal of the wireless communication device is prevented (i.e., installed within the housing of the power tool 104 at the time of manufacturing the power tool 104). Other power tool devices 104a, 104b, 104c, however, include an insertable device compartment configured to receive the wireless communication device (e.g., an insertable wireless communication device 705, 1205, and 1705 as explained in greater detail below). The insertable device compartment allows the wireless communication device to be optionally added to the power tool 104 as an accessory after manufacturing of the power tool 104. In some embodiments, the wireless communication device that is optionally added to the power tool 104 includes an irreversible lock that, once engaged with the wireless communication device, cannot be unlocked (except by authorized service personnel) as explained in greater detail below. In some embodiments, the insertable device compartment is configured to receive a dummy module (e.g., a plastic housing without internal electronic components) that may be installed at the time of manufacturing the power tool but may be later removed and replaced with a wireless communication device by a user if desired.

When the power tool devices 104a, 104b, 104c include the wireless communication device in the insertable device compartment, the power tool devices 104a, 140b, 104c can operate similar to the power tool device 104d as if the wireless communication device was integrally formed within the power tool 104. The power tool 104 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool 104 has been used, whether maintenance is recommended or has been performed in the past, and identify malfunctioning components or other reasons for certain performance issues. The external device 108 can also transmit data to the power tool 104 for power tool configuration, firmware updates, or to send commands (e.g., turn on a work light, lock the power tool 104, and the like). The external device 108 also allows a user to set operational parameters, performance parameters, select tool modes, and the like for the power tool 104 (e.g., adjust operating modes or parameters of the power tool 104 such as motor speed, motor ramp-up, torque, and the like). The external device 108 may also communicate with a remote server 112 and may receive configuration and/or settings for the power tool 104, or may transmit operational data or other power tool status information to the remote server 112.

The external device 108 may be, for example, a laptop computer, a tablet computer, a smartphone, a cellphone, or another electronic device capable of communicating wirelessly with the power tool 104 and providing a user interface. The external device 108 provides the user interface and allows a user to access and interact with tool information. The external device 108 can receive user inputs to determine operational parameters, enable or disable features, and the like. The user interface of the external device 108 provides an easy-to-use interface for the user to control and customize operation of the power tool 104.

Figure 2:
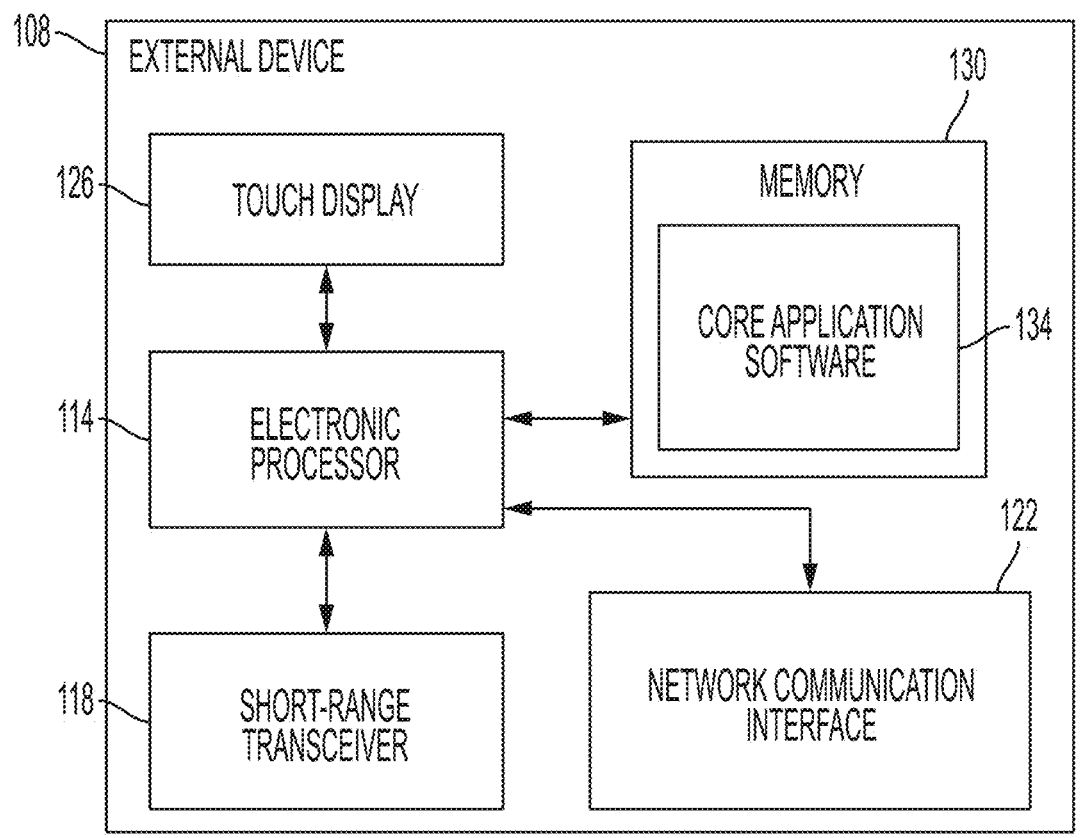
FIG. 2 illustrates a block diagram of an external device of the communication system.

As shown in FIG. 2, the external device 108 includes an external device electronic processor 114, a short-range transceiver 118, a network communication interface 122, a touch display 126, and a memory 130. The external device electronic processor 114 is coupled to the short-range transceiver 118, the network communication interface 122, the touch display 126, and the memory 130. The short-range transceiver 118, which may include or is coupled to an antenna (not shown), is configured to communicate with a compatible transceiver within the power tool 104. The short-range transceiver 118 can also communicate with other electronic devices. The network communication interface 122 communicates with a network to enable communication with the remote server 112. The network communication interface 122 may include circuitry that enables the external device 108 to communicate with the network. In some embodiments, the network may be an Internet network, a cellular network, another network, or a combination thereof.

The memory 130 of the external device 108 also stores core application software 134. The external device electronic processor 114 accesses and executes the core application software 134 in memory 130 to launch a control application that receives inputs from the user for the configuration and operation of the power tool 104. The short-range transceiver 118 of the external device 108 is compatible with a transceiver of the power tool 104 (described in further detail below). The short-range transceiver 118 may include, for example, a Bluetooth® communication controller. The short-range transceiver 118 allows the external device 108 to communicate with the power tool 104.

The remote server 112 may store data obtained by the external device 108 from, for example, the power tool 104. The remote server 112 may also provide additional functionality and services to the user. In one embodiment, storing the information on the remote server 112 allows a user to access the information from a plurality of different devices and locations (e.g., a remotely located desktop computer). In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool 104, typical usage of the power tool 104, and other relevant characteristics and/or measures of the power tool 104. In some embodiments, the power tool 104 may be configured to communicate directly with the server 112 through an additional wireless interface or with the same wireless interface that the power tool 104 uses to communicate with the external device 108.

The power tool 104 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational torque to a socket to turn a fastener (e.g., a bolt), while a reciprocating saw is associated with the task of generating a reciprocating output motion (e.g., for pushing and pulling a saw blade). The task(s) associated with a particular tool may also be referred to as the primary function(s) of the tool.

Although the power tool 104 illustrated and described herein is a reciprocating saw, embodiments of the invention similarly apply to and can be used in conjunction with a variety of power tools and/or accessories. For instance, the power tool 104 may be another power tool, test and measurement equipment, a vacuum cleaner, a worksite radio, outdoor power equipment, a vehicle, or another device. Power tools can include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other devices can include electronic key boxes, calculators, cellular phones, head phones, cameras, motion sensing alarms, flashlights, worklights, weather information display devices, a portable power source, a digital camera, a digital music player, a radio, and multi-purpose cutters.

Figure 3:
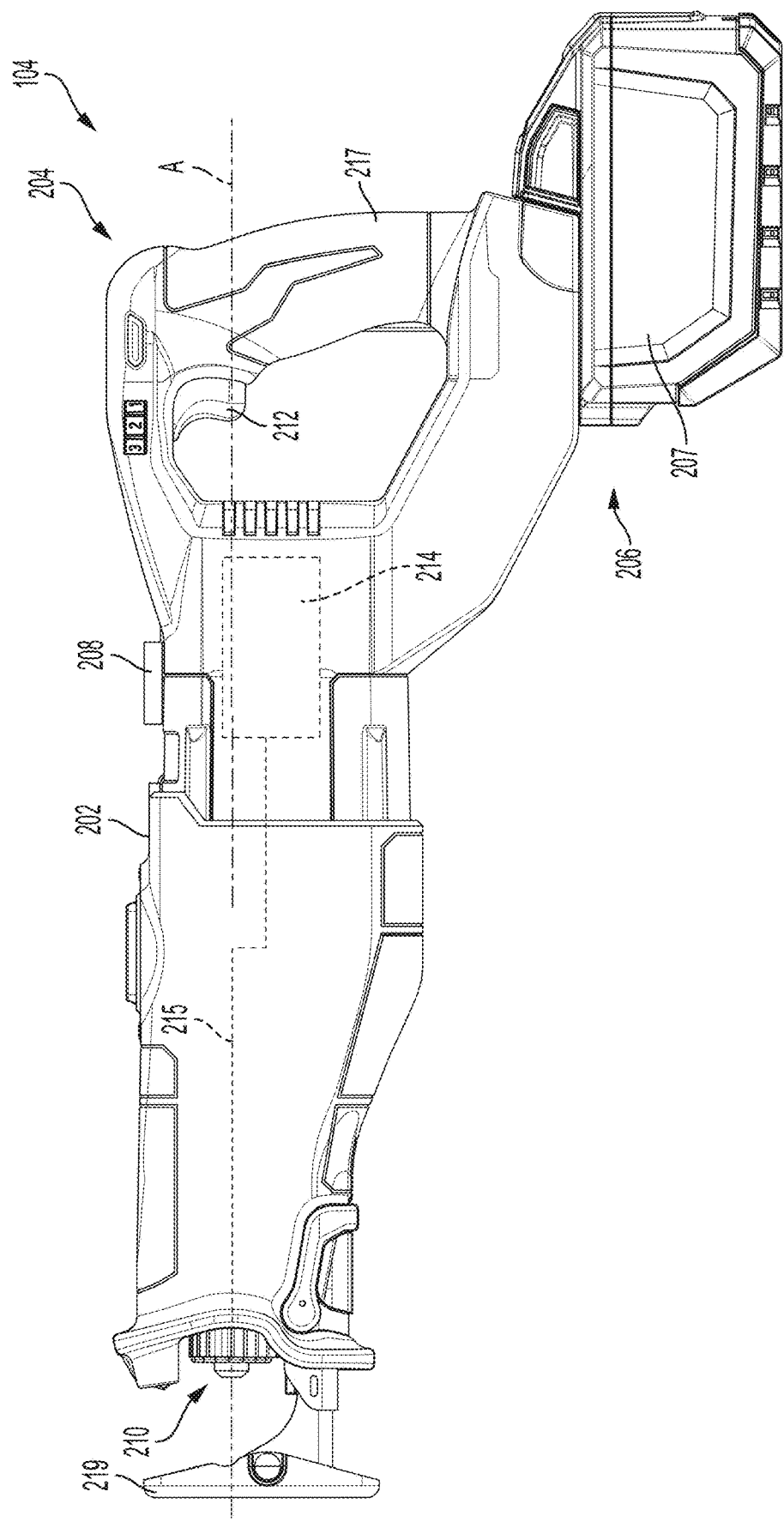
FIG. 3 illustrates a power tool of the communication system.

As shown in FIG. 3, the power tool 104 defines a longitudinal axis A. The power tool 104 includes a housing including a main body 202 (i.e., a motor housing portion), a handle assembly 204, and a battery pack receiving portion 206 that receives a battery pack 207. The power tool 104 also includes a selection switch 208, an output drive device or mechanism 210, and a trigger 212 (or other actuator). The power tool 104 further includes a motor 214 within the main body 202 of the housing and having a rotor 280 and a stator 285 (see FIG. 14). The rotor 280 is coupled to a motor shaft arranged to produce an output outside of the housing via the output drive device or mechanism 210. A drive mechanism 215 (i.e., a transmission) converts rotational motion of the motor 214 to reciprocating motion of a reciprocating spindle to reciprocate a saw blade in a direction substantially parallel to the longitudinal axis A of the power tool 104. The saw blade (not shown) is attachable to the output drive device 210 via a blade holder (e.g., a blade clamp). The power tool 104 further includes a shoe 219 that is pivotally mounted on a distal end of the power tool 104 away from the main body 202. In other constructions, the shoe 219 may be fixedly mounted to the power tool 104, or mounted in other suitable ways. In other constructions, other types of shoes 219 are employed. The shoe 219 provides a guiding surface for resting the power tool 104 against a workpiece (not shown) during cutting operations. The handle assembly 204 includes a grip portion 217 and the trigger 212 adjacent the grip portion 217 for actuating the motor 214. The trigger 212 is positioned such that a user can actuate the trigger 212 using the same hand that is holding the grip portion 217, for example, with an index finger.

The housing of the power tool 104 (e.g., the main body 202, the handle 204, and the battery pack receiving portion 206) are composed of a durable and light-weight plastic material. The drive device 210 is composed of a metal (e.g., steel). The drive device 210 on the power tool 104 of FIG. 3 is a blade holder. However, each power tool 104 may have a different drive device 210 specifically designed for the task associated with the power tool 104. For example, the drive device 210 for a power drill may include a bit driver or chuck, while the drive device 210 for a pipe cutter may include a blade or blade holder. The selection switch 208 is configured to select an operation mode for the power tool 104. Different operation modes may have different speed or torque levels, or may control the power tool 104 based on different sets of parameters. In some embodiments, the selection switch 208 is a mode pad 208. The mode pad 208 allows a user to select a mode of the power tool 104 and indicates to the user the currently selected mode of the power tool 104.

Figure 4:
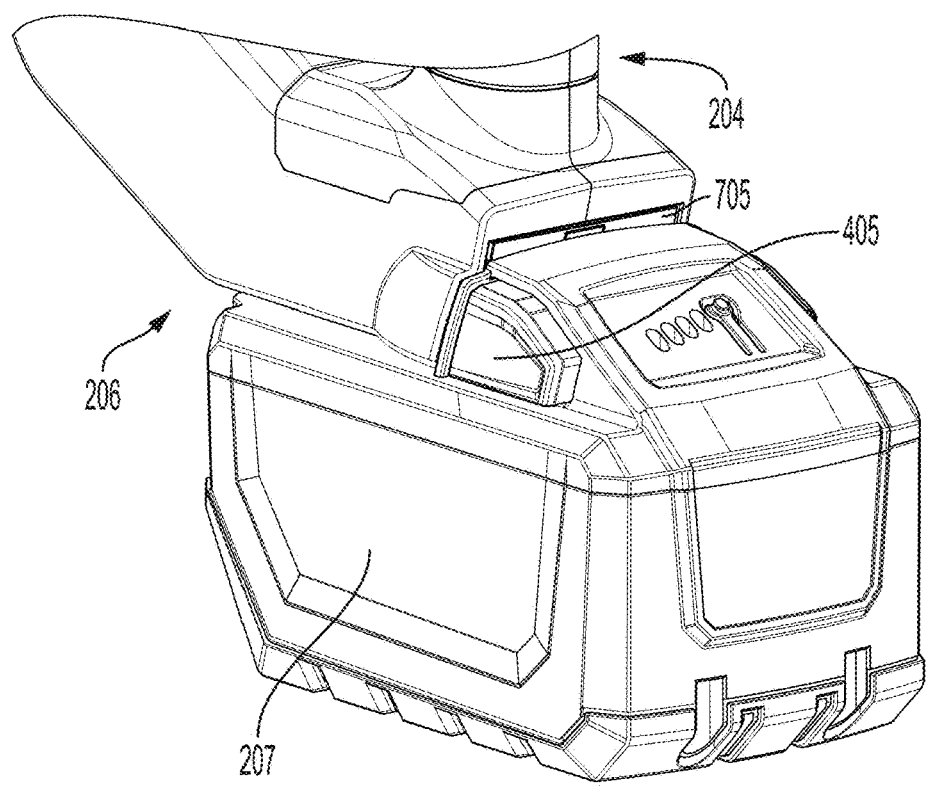
FIG. 4 is a perspective view of a battery pack receiving portion of the power tool of FIG. 3 according to one example embodiment.

FIG. 4 is a perspective view of the battery pack receiving portion 206. The battery pack receiving portion 206 is configured to receive and couple to the battery pack 207. In some embodiments, the battery pack 207 is the power tool device 104b illustrated in FIG. 1. The battery pack 207 provides power to the power tool 104. The battery pack 207 may also be referred to as a main power source. The battery pack receiving portion 206 of the power tool 104 includes a terminal block 505 (see FIG. 5) and a battery pack compartment 535 including battery pack support structure to receive and support the battery pack 207. For example, the battery pack support structure may include rails 510 that engage the battery pack 207 to secure the battery pack 207 to the power tool 104 to physically and electrically connect the battery pack 207 to the power tool 104 via the terminal block 505. For example, the battery pack 207 may include a raised portion 605 with guide rails 610 (see FIG. 6) to allow the battery pack 207 to slidably engage corresponding rails 510 (see FIG. 5) on the battery pack receiving portion 206. In some embodiments, the battery pack 207 also includes latching tabs 615 that are spring-biased and configured to engage corresponding structures of the battery pack receiving portion 206 to secure the battery pack 207 to the power tool 104. To remove the battery pack 207 from the power tool 104, actuators 405 of the battery pack 207 that are mechanically linked to the latching tabs 615 are pressed inward to cause the latching tabs 615 to move inward and disengage from the corresponding structure in the battery pack receiving portion 206 and allow the battery pack 207 to be slidably removed from the power tool 104.

Figure 5:
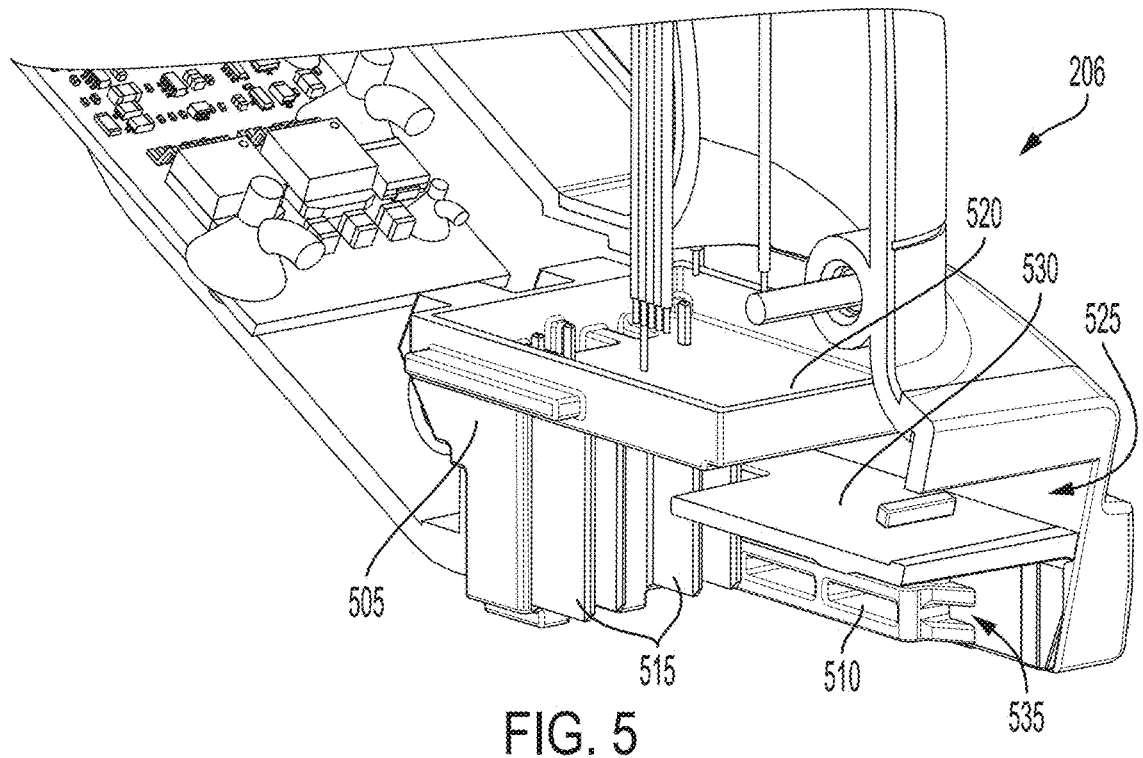
FIG. 5 is a perspective view of the battery pack receiving portion of FIG. 4 with half of a housing removed from the power tool and with a battery pack detached from the power tool according to one example embodiment.

FIG. 5 is a perspective view of the battery pack receiving portion 206 with half of the housing removed from the power tool 104 and with the battery pack 207 detached from the power tool 104. As shown in FIG. 5, the terminal block 505 includes male terminals 515 (i.e., tool terminals 515) that make physical and electrical contact with female terminals 620 of the battery pack 207 (i.e., battery terminals 620) when the battery pack 207 is coupled to the battery pack receiving portion 206. Such contact allows for the power tool 104 to be electrically connected to the battery pack 207. For example, two of the terminals 515 are used for transferring power from the battery pack 207 to the power tool 104 (i.e., a positive power terminal and a negative power terminal). One or more of the other terminals 515 may be used for communication between the power tool 104 and the battery pack 207. For example, each of the power tool 104 and the battery pack 207 may include an electronic processor (e.g., a microcontroller) that can bidirectionally communicate with each other. In some embodiments, one or more of the terminals 515 are used to directly provide a sensor reading from a sensor of the power tool 104 or the battery pack 207 to the other of the power tool 104 and the battery pack 207. Although FIG. 5 shows four terminals 515 on the terminal block 505, in other embodiments, the terminal block 505 may include more or fewer terminals 515. Additionally, although the terminals 515 of the terminal block 505 are shown as male terminals and the terminals 620 of the battery pack 207 are shown as female terminals, in some embodiments, the terminal block 505 may include female terminals and the battery pack 207 may include male terminals. Although not shown in FIG. 5, in some embodiments, a top surface 520 of the terminal block 505 includes a printed circuit board (PCB) configured to electrically connect to one or more of the terminals 515. The top surface 520 of the terminal block 505 may form a potting boat as shown in FIG. 5 to receive the PCB. In some embodiments, the PCB on the top surface 520 of the terminal block 505 is a main control PCB of the power tool 104 that includes a microcontroller and a gate driver that drives field-effect transistors (FETs) located on another PCB. For example, the PCB on the top surface 520 of the terminal block 505 may include an electronic processor 226 explained below with respect to FIG. 14. The electronic processor 226 may control tool operations such as storing logged information (e.g., usage data), interfacing with the trigger 212 to determine when the trigger 212 is actuated, controlling overload shutdown conditions of the power tool 104, and the like.

As shown in FIG. 5, in some embodiments, the battery pack receiving portion 206 of the power tool 104 includes an insertable device compartment 525 located above the battery pack 207 when the battery pack 207 is attached to the power tool 104. In some embodiments, the insertable device compartment 525 is configured to receive and support an insertable wireless communication device 705 (see FIG. 7A) that provides enhanced functionality to the power tool 104 (e.g., communication capabilities, tracking capabilities, etc.) as described in greater detail below. In some embodiments, a bottom surface of the insertable device compartment 525 is formed by a shelf 530 located above the battery pack 207 when the battery pack 207 is attached to the power tool 104. As shown in FIG. 5 where a portion of a clamshell housing is removed from the power tool 104, in some embodiments, the insertable device compartment 525 spans a dividing line of the clamshell housing of the power tool 104 where one portion of the insertable device compartment 525 (i.e., a left portion) is included on one piece of the clamshell housing (i.e., a left piece) and another portion of the insertable device compartment 525 (i.e., a right portion) is included on another piece of the clamshell housing (i.e., a right piece).

Also as shown in FIG. 5, in some embodiments, the insertable device compartment 525 is located underneath the top surface 520 of the terminal block 505 but above the battery pack 207 when the battery pack 207 is attached to the power tool 104. To allow for such an arrangement, in some embodiments, the terminal block 505 and its terminals 515 have an increased height compared to terminal blocks of power tools that do not include the insertable device compartment 525. This increased height of the terminal block 505 and the terminals 515 allow the insertable wireless communication device 705 to share the same terminal block 505 and/or at least some of the same terminals 515 with the battery pack 207. In other words, both the battery pack 207 and the insertable wireless communication device 705 are physically and electrically connected to one or more of the same terminals 515 of the terminal block 505. Such a shared terminal arrangement is useful because many different types of power tools (e.g., reciprocating saws, drills, circular saws, etc.) have different housing shapes and designs. However, such power tools often have identical battery pack receiving portions when the power tools are made by the same manufacturer (e.g., to allow the same battery pack to be used with multiple different power tools). Thus, a modification of the battery pack receiving portion 206 to include the insertable device compartment 525 as shown in FIG. 5 may be universally implemented across many different types of power tools despite the difference in housing shapes and designs of the different types of power tools.

As shown in FIG. 5, in some embodiments, the shelf 530 acts as a partition that separates the insertable device compartment 525 and the battery pack compartment 535. In some embodiments, the shelf 530 is located on a plane approximately perpendicular to the terminals 515 that divides the terminals 515 into an upper portion and a lower portion. For example, the upper portion of the terminals 515 is the portion of the terminals 515 that is located above the plane on which the shelf 530 is located. In other words, the upper portion of the terminals 515 is located in the insertable device compartment 525. The lower portion of the terminals 515 is the portion of the terminals 515 that is located above the plane on which the shelf 530 is located. In other words, the lower portion of the terminals 515 is located in the battery pack compartment 535. As shown in FIG. 5, in some embodiments, the terminals 515 extend from the terminal block 505 through the insertable device compartment 525 and into the battery pack compartment 535. The tool terminals 515 in such embodiments are configured to be physically and electrically connected to at least one of the group consisting of the battery terminals 620 and device terminals 710 of the insertable wireless communication device 705 as described in greater detail below. Although the tool terminals 515 are shown in FIG. 5 as including a flat rectangular shape where the entire terminal 515 lies in a single vertical plane, in other embodiments, one or more of the tool terminals 515 vary in size, shape, and/or plane location as illustrated by the longer terminals 1838 shown in FIG. 18B. In some embodiments, varying the size, shape, and/or plane location of one or more of the tool terminals 515 allows such terminals to physically and electrically connect to battery terminals 620 and/or device terminals 710 that have a different size or shape than each other and/or that are located in different vertical plane than each other.

In some embodiments, the height (i.e., thickness) of the insertable wireless communication device 705 is less than approximately one inch (i.e., less than approximately twenty-five millimeters) in order to reduce the increase in height of the battery pack receiving portion 206, the terminal block 505, and the terminals 515 resulting from accommodating the insertable device compartment 525 and the insertable wireless communication device 705. In some embodiments, the height of the insertable wireless communication device 705 and/or the height of the insertable device compartment 525 is less than approximately twenty millimeters, is less than approximately fifteen millimeters, is less than approximately twelve millimeters, is less than approximately ten millimeters, is between ten and twenty-five millimeters, is between ten and twenty millimeters, or is between ten and fifteen millimeters. In some embodiments, the height of the insertable wireless communication device 705 is approximately 11.7 millimeters. In some embodiments, the height (i.e., thickness) of the insertable wireless communication device 705 mentioned above is the height of the insertable wireless communication device 705 from a bottom surface 720 of the insertable wireless communication device 705 that faces the battery pack 207 when the insertable wireless communication device 705 and the battery pack 207 are attached to the power tool 104 to a top surface 725 of the insertable wireless communication device 705 that faces the top of the terminal block 505 when the insertable wireless communication device 705 is attached to the power tool 104. For example, see height H of the insertable wireless communication device 705 shown in the side profile view of the battery pack receiving portion 206 with part of the housing removed in FIG. 8.

FIG. 7B is a top view of the insertable wireless communication device 705 with a top part of the housing of the insertable wireless communication device 705 removed. As shown in FIG. 7B, the insertable wireless communication device 705 includes a PCB 730 that includes components that provide enhanced functionality to the power tool 104 (e.g., communication capabilities, tracking capabilities, etc.) as described in greater detail below. FIG. 7B illustrates approximate dimensions (i.e., length and width) of the insertable wireless communication device 705 and the PCB 730. In the embodiment shown, the length of the insertable wireless communication device 705 is approximately fifty-three millimeters and the width of the insertable wireless communication device 705 is approximately forty-eight millimeters. In some embodiments, the PCB 730 has a length of approximately forty millimeters, a width of approximately forty-five millimeters, and a height (i.e., thickness) of approximately 4.7 millimeters. In some embodiments, the surface area of the PCB 730 (i.e., the area defined by the length and the width) allows all components that are mounted on the PCB 730 to be mounted on single surface of the PCB 730, which reduces the height of the insertable wireless communication device 705.

Figure 8:
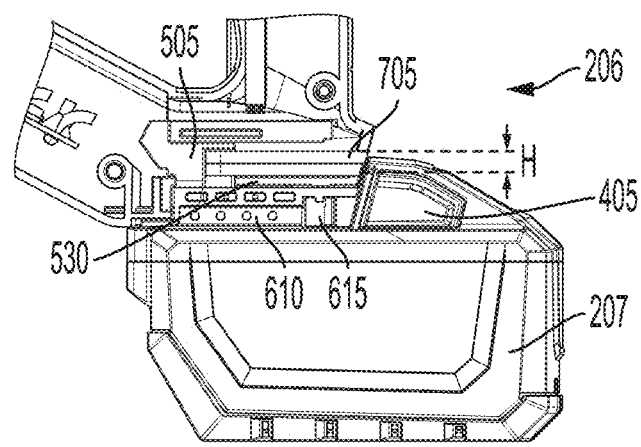
FIG. 8 is a side profile view of the battery pack receiving portion of the power tool of FIG. 3 with part of the housing removed according to one example embodiment.
Figure 9:
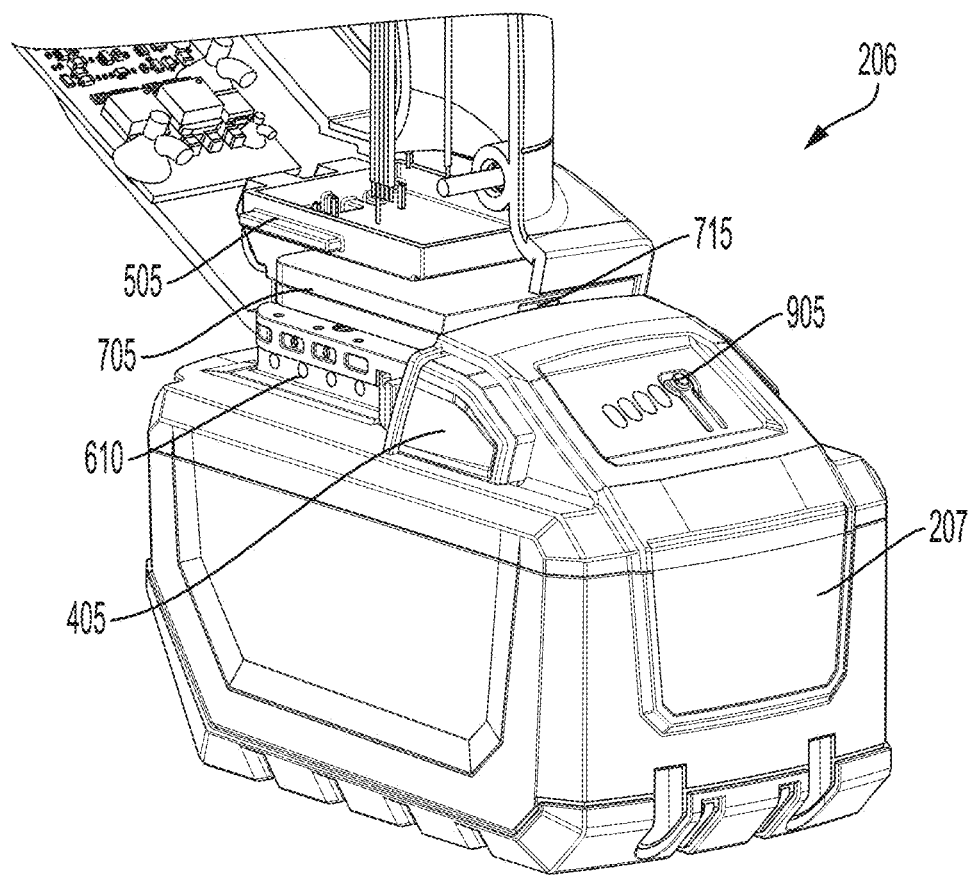
FIG. 9 is a perspective view of the battery pack receiving portion of the power tool of FIG. 3 with part of the housing removed according to one example embodiment.

As shown in FIG. 7A, the insertable wireless communication device 705 also includes a light-emitting diode (LED) window 715 that allows an LED that is connected to the PCB 730 to provide information to the user as explained in greater detail below. As shown in FIG. 9, while the battery pack 207 covers part of the back (i.e., rear) of the insertable wireless communication device 705 (i.e., the bottom part), part of the back of the insertable wireless communication device 705 (i.e., the top part) remains exposed and, thus, allows the LED window 715 to be viewable above the battery pack 207 when the battery pack 207 is coupled to the power tool 104. In particular, the LED window 715 is located just above a display 905 of the battery pack 207 that provides information to a user (e.g., a fuel gauge that indicates charge level of the battery pack 207). Accordingly, a user can easily view both the display 905 of the battery pack 207 and the LED window 715 of the insertable wireless communication device 705 because they are located adjacent to each other. As shown in FIGS. 8 and 9, when the battery pack 207 is coupled to and supported by the battery pack receiving portion 206, the battery pack 207 at least partially blocks an opening of the insertable device compartment 525 such that the insertable wireless communication device 530 may not be removed from the insertable device compartment 525 if it has been previously inserted. In other words, a top portion of the battery pack 207 overlaps a horizontal plane defined by the insertable device compartment 525 as indicated in FIG. 8.

As shown in FIG. 7A, the insertable wireless communication device 705 includes female terminals 710 (i.e., device terminals 710) that are similar to the terminals 620 of the battery pack 207. In other words, the terminals 710 of the insertable wireless communication device 705 may be the same type of terminal as the terminals 620 of the battery pack 207. The terminals 710 engage one or more terminals 515 of the terminal block 505 when the insertable wireless communication device 705 is located in the insertable device compartment 525 and attached to the power tool 104. In other words, the terminals 710 are physically and electrically coupled to at least one of the terminals 515 of the terminal block 505 of the power tool 104. The terminals 710 may be used for similar purposes as the terminals 620 of the battery pack 207. For example, two of the terminals 710 are used for transferring power from the battery pack 207 to the insertable wireless communication device 705 (i.e., a positive power terminal and a negative power terminal) to provide power to the electrical components inside the insertable wireless communication device 705 and/or to charge an internal battery (e.g., a coin cell) of the insertable wireless communication device 705, as explained in greater detail below. One or more of the other terminals 710 may be used for communication between the insertable wireless communication device 705 and at least one of the power tool 104 and the battery pack 207. For example, the insertable wireless communication device 705 includes a wireless communication circuit that allows the external device 108 to bidirectionally communicate with at least one of an electronic processor of the power tool 104 and an electronic processor of the battery pack 207 via the wireless communication circuit. In some embodiments, one or more of the terminals 710 is used to directly receive a sensor reading from a sensor of at least one of the power tool 104 and the battery pack 207.

Figure 10:
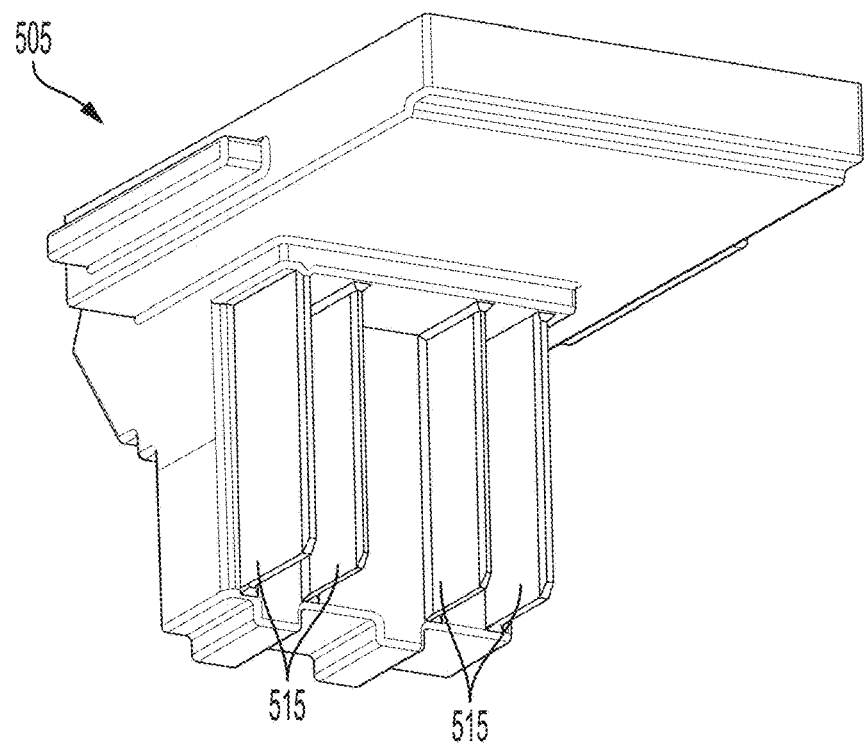
FIG. 10 is a bottom perspective view of a terminal block of the power tool of FIG. 3 according to one example embodiment.
Figure 11:
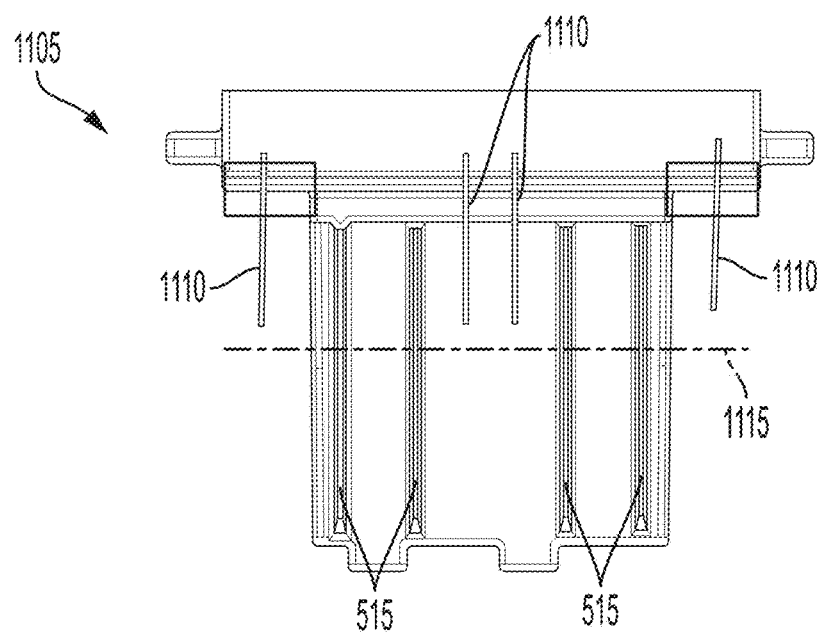
FIG. 11 is a back (i.e., rear) view of a modified terminal block of the power tool of FIG. 3 according to one example embodiment.

As explained above, in some embodiments, the terminals 620 of the battery pack 207 and the terminals 710 of the insertable wireless communication device 705 are physically and electrically connected to one or more of the same terminals 515 of the terminal block 505 of the power tool 104. In other words, the terminals 620 and the terminals 710 are connected to one or more shared terminals of the terminals 515 (for example, see FIGS. 8 and 9). In some embodiments, at least one of the battery pack 207 and the insertable wireless communication device 705 include at least one terminal that is connected to a terminal of the terminals 515 of the power tool 104 that is not shared with the other of the battery pack 207 and the insertable wireless communication device 705. For example, FIG. 10 is a bottom perspective view of the terminal block 505 shown in previous figures. The terminal block 505 includes four shared terminals 515 that are physically and electrically coupleable to both the battery pack 207 and the insertable wireless communication device 705. FIG. 11 is a back (i.e., rear) view of a modified terminal block 1105 according to another embodiment. The modified terminal block 1105 still includes the four terminals 515 that physically and electrically couple to the battery pack 207. However, the modified terminal block 1105 additionally includes four other terminals 1110 (i.e., tool terminals 1110) that physically and electrically couple to the insertable wireless communication device 705 but not to the battery pack 207. In such embodiments, the terminals 710 of the insertable wireless communication device 705 may be modified accordingly to physically and electrically couple to the terminals 1110 of the modified terminal block 1105. In embodiments that utilize the modified terminal block 1105, the insertable wireless communication device 705 may still be configured to physically and electrically couple with at least one shared terminal 515 (e.g., to receive power from the battery pack 207 via power terminals). In other words, at least one of the insertable wireless communication device 705 and the battery pack 207 physically and electrically couples to at least one shared terminal (e.g., one or more terminal of the terminals 515) and one unshared terminal (e.g., one or more terminals of the terminals 1110). Alternatively, the insertable wireless communication device 705 may be configured to physically and electrically couple solely with the terminals 1110 such that there are no shared terminals between the insertable wireless communication device 705 and the battery pack 207. In all of the above-noted embodiments, the terminal block 505, 1105 is nevertheless a common interface for two different devices (i.e., the battery pack 207 and the insertable wireless communication device 705).

As shown in FIG. 11, in some embodiments, terminals 1110 that are to be coupled to the insertable wireless communication device 705 and that are not coupleable to the battery pack 207 (i.e., unshared terminals) have a shorter height than the terminals 515 that are shared terminals or terminals that are to be coupled solely to the battery pack 207. As shown in FIG. 11, in some embodiments, the terminals 1110 do not extend through a plane 1115 on which the shelf 530 is located. In such embodiments, the terminals 1110 extend from the terminal block 1105 into the insertable device compartment 525 without extending into the battery pack compartment 535. Although FIG. 11 illustrates four terminals 515 and four terminals 1110, in some embodiments, the terminal block 1105 may include more or fewer terminals 515 and/or 1110. Additionally, although the terminals 515 and 1110 of the terminal block 1105 are shown as male terminals, in some embodiments, the terminal block 1105 may include female terminals and the battery pack 207 and the insertable wireless communication device 705 may include male terminals.

Figure 12:
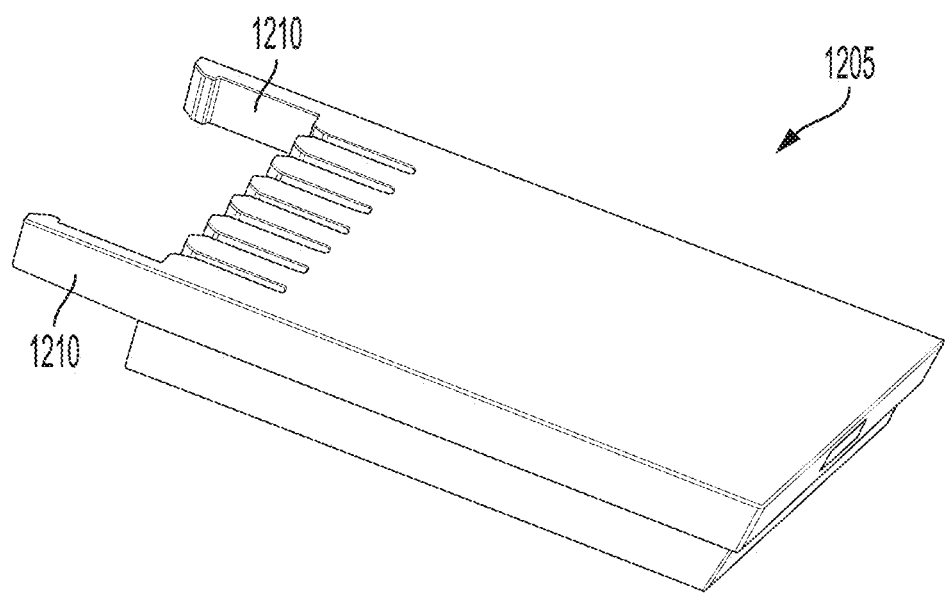
FIG. 12 illustrates an insertable wireless communication device according to another example embodiment.
Figure 13:
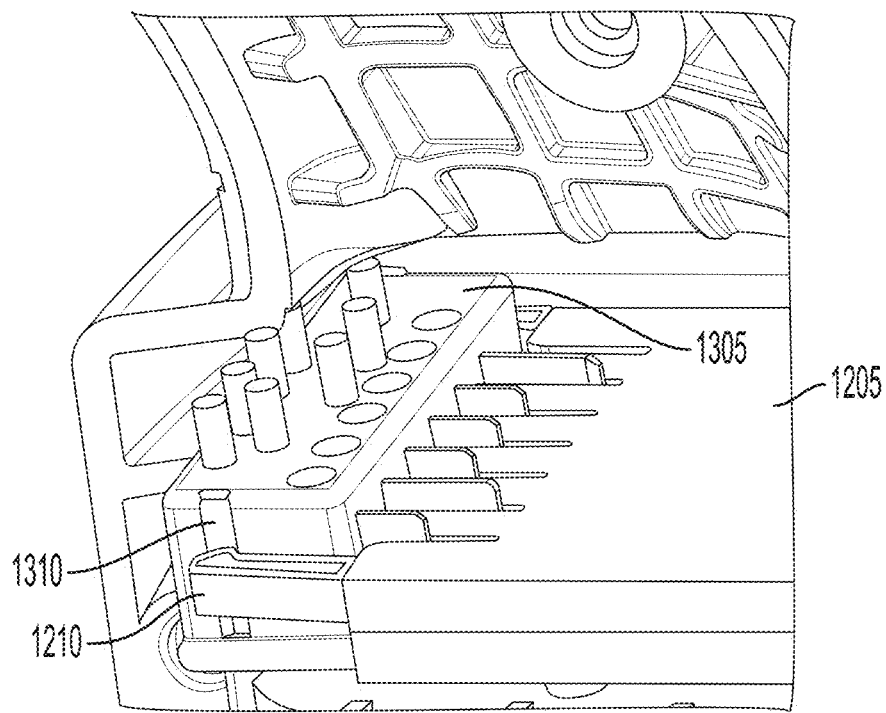
FIG. 13 illustrates a terminal block of the power tool of FIG. 3 according to another example embodiment.

FIG. 12 illustrates an insertable wireless communication device 1205 similar to the insertable wireless communication device 705, and the previous description thereof applies to the wireless communication device 1205 except that the wireless communication device 1205 includes snap members 1210 that are used to secure the insertable wireless communication device 1205 to a terminal block of the power tool 104. With reference to FIG. 13 where part of the clamshell housing is removed, the insertable wireless communication device 1205 is inserted into insertable device compartment 525 until the snap members 1210 settle into grooves 1310 on lateral sides of a terminal block 1305 that is similar to the terminal block 505, 1105 explained previously herein, but for the addition of the grooves 1310. In some embodiments, an edge of the snap members 1210 that enters the grooves 1310 includes a return angle to allow removal of the insertable wireless communication device 1205. A larger return angle than insert angle on the snap members 1210 makes it is easier to insert the insertable wireless communication device 1205 and more difficult to remove the insertable wireless communication device 1205. For example, in some embodiments, the insertable wireless communication device 1205 is not intended to be removed by a user once the insertable wireless communication device 1205 is installed in the insertable device compartment 525. However, the insertable wireless communication device 1205 may be removable by authorized personnel at a service center. In other embodiments, the insertable wireless communication device 1205 may be removable by a user after installation in the insertable device compartment 525. The snap members 1210 and the grooves 1310 are merely an example of one manner in which the insertable wireless communication device 1205 may be secured to the power tool 104 in the insertable device compartment 525. In other embodiments, the insertable wireless communication device 705 and/or 1205 is secured to the power tool 104 in other manners.

Figure 14:
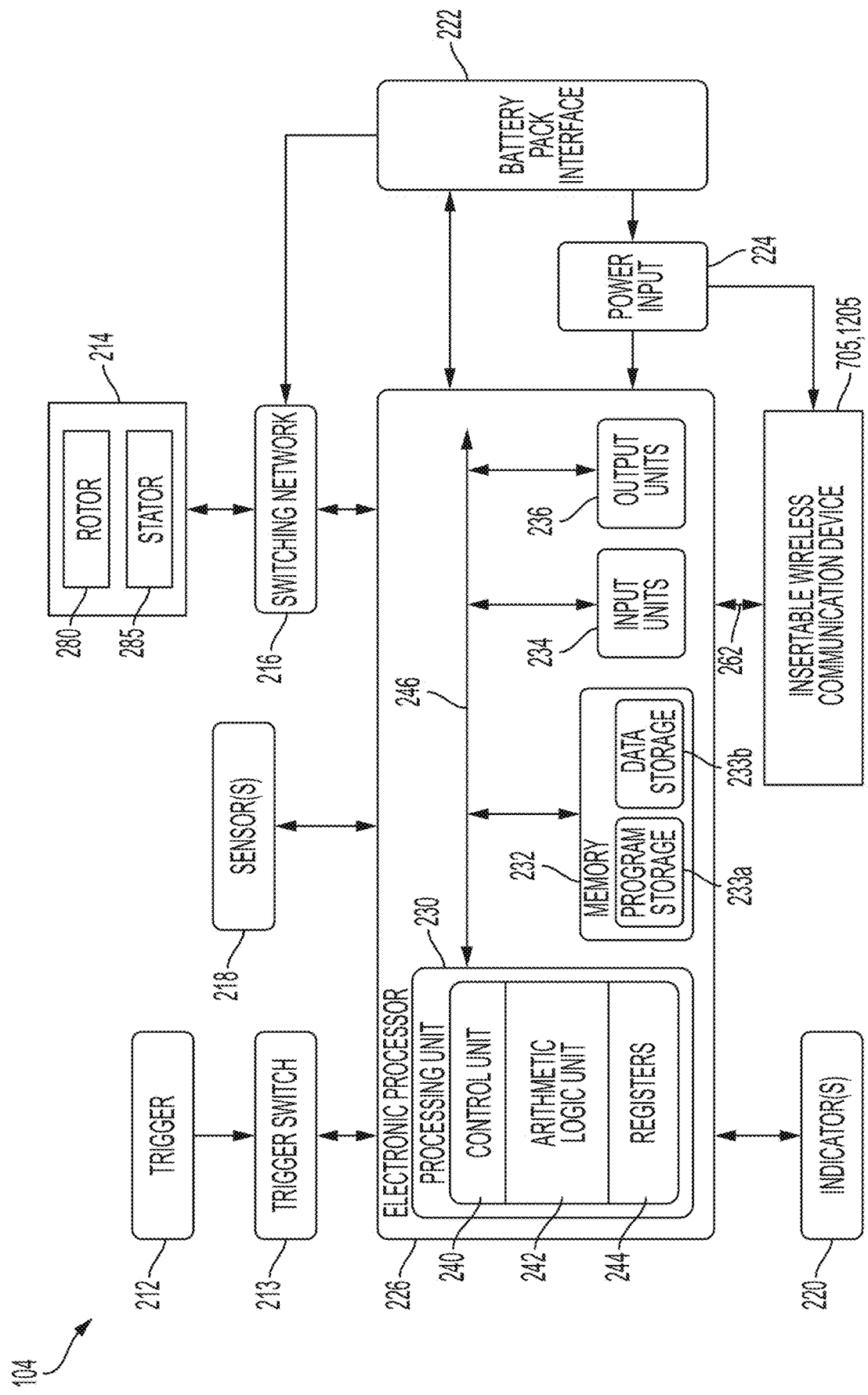
FIG. 14 illustrates a block diagram of the power tool according to one example embodiment.

FIG. 14 illustrates a block diagram of the power tool 104 according to one example embodiment. As shown in FIG. 14, the power tool 104 includes the motor 214 that includes the rotor 280 and the stator 285. The motor 214 actuates the drive device 210 and allows the drive device 210 to perform the particular task. The battery pack 207 couples to the power tool 104 via a battery pack interface 222 and provides electrical power to energize the motor 214. The trigger 212 is coupled with a trigger switch 213. The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the trigger switch 213 becomes activated, which causes the motor 214 to be energized. When the trigger 212 is released by the user, the trigger switch 213 becomes deactivated, and the motor 214 is de-energized.

As shown in FIG. 14, the power tool 104 also includes a switching network 216, sensors 218, indicators 220, a power input unit 224, and an electronic processor 226. The battery pack interface 222 includes a combination of mechanical (e.g., the battery pack receiving portion 206 including battery support structure) and electrical components (e.g., terminals 515) configured to and operable for interfacing (e.g., mechanically, electrically, and communicatively connecting) the power tool 104 with the battery pack 207. The battery pack interface 222 transmits the power received from the battery pack 207 to the power input unit 224. The power input unit 224 includes combinations of active and passive components (e.g., voltage step-down controllers, voltage converters, rectifiers, filters, etc.) to regulate or control the power received through the battery pack interface 222 and provided to the insertable wireless communication device 705, 1205 and the electronic processor 226.

The switching network 216 enables the electronic processor 226 to control the operation of the motor 214. Generally, when the trigger 212 is depressed (i.e., the trigger switch 213 is closed), electrical current is supplied from the battery pack interface 222 to the motor 214, via the switching network 216. When the trigger 212 is not depressed, electrical current is not supplied from the battery pack interface 222 to the motor 214. In some embodiments, the trigger switch 213 may include sensors to detect the amount of trigger pull (e.g., released, 20% pull, 50% pull, 75% pull, or fully depressed). In some embodiments, the amount of trigger pull detected by the trigger switch 213 is related to or corresponds to a desired speed of rotation of the motor 214. In other embodiments, the amount of trigger pull detected by the trigger switch 213 is related to or corresponds to a desired torque, or other parameter. In response to the electronic processor 226 receiving the activation signal from the trigger switch 213, the electronic processor 226 activates the switching network 216 to provide power to the motor 214. The switching network 216 controls the amount of current available to the motor 214 and thereby controls the speed and torque output of the motor 214. The switching network 216 may include several field effect transistors (FETs), bipolar transistors, or other types of electrical switches, such as six FETs in a bridge arrangement. The electronic processor 226, in some embodiments, drives successive switching elements of the switching network 216 with respective pulse width modulation (PWM) signals to alternately drive stator coils of the stator 285, thus inducing rotation of the rotor 280. Although the power tool 104 is described above as including the switching network 216 that controls PWM signals to alternatively drive the motor 214 that may be a brushless direct current (DC) motor, in other embodiments, the motor 214 may include a brushed motor that is driven in accordance with brushed motor control techniques or other types of motors driven in accordance with corresponding other types of motor control techniques.

The sensors 218 are coupled to the electronic processor 226 and communicate to the electronic processor 226 various signals indicative of different parameters of the power tool 104 or the motor 214. The sensors 218 include, for example, one or more current sensors, one or more voltage sensors, one or more temperature sensors, one or more speed sensors, one or more Hall Effect sensors, etc. For example, the speed of the motor 214 can be determined using a plurality of Hall Effect sensors to sense the rotational position of the motor 214. In some embodiments, the electronic processor 226 controls the switching network 216 in response to signals received from the sensors 218. For example, if the electronic processor 226 determines that the speed of the motor 214 is increasing too rapidly based on information received from the sensors 218, the electronic processor 226 may adapt or modify the active switches or switching sequence within the switching network 216 to reduce the speed of the motor 214. Data obtained via the sensors 218 may be saved in the electronic processor 226 as tool usage data.

The indicators 220 are also coupled to the electronic processor 226 and receive control signals from the electronic processor 226 to turn on and off or otherwise convey information based on different states of the power tool 104. The indicators 220 include, for example, one or more light-emitting diodes ("LED"), or a display screen. The indicators 220 can be configured to display conditions of, or information associated with, the power tool 104. For example, the indicators 220 are configured to indicate measured electrical characteristics of the power tool 104, the status of the power tool 104, etc. The indicators 220 may also include elements to convey information to a user through audible or tactile outputs.

As described above, the electronic processor 226 is electrically and/or communicatively connected to a variety of components of the power tool 104. In some embodiments, the electronic processor 226 includes a plurality of electrical and electronic components that provide power, operational control, and protection to the components within the electronic processor 226 and/or power tool 104. For example, the electronic processor 226 includes, among other things, a processing unit 230 (e.g., a microprocessor, a microcontroller, or another suitable programmable device), a memory 232, input units 234, and output units 236. The processing unit 230 includes, among other things, a control unit 240, an arithmetic logic unit ("ALU") 242, and a plurality of registers 244 (shown as a group of registers in FIG. 14). In some embodiments, the electronic processor 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233*a* and a data storage area 233*b*. The program storage area 233*a* and the data storage area 233*b* can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the electronic processor 226. The software includes, for example, firmware, one or more applications, program data, filters, rules, and other executable instructions. The electronic processor 226 is configured to retrieve from memory and execute, among other things, instructions related to the control processes and methods described herein. The electronic processor 226 is also configured to store power tool information on the memory 232. The power tool information stored on the memory 232 may include power tool identification information (e.g., including a unique identifier of the power tool 104) and also power tool operational information including information regarding the usage of the power tool 104, information regarding the maintenance of the power tool 104, power tool trigger event information, parameter information to operate the power tool 104 in a particular mode, and other information relevant to operating or maintaining the power tool 104. In other constructions, the electronic processor 226 includes additional, fewer, or different components.

The electronic processor 226 also includes a data connection (e.g., a communication channel) 262 to optionally couple to the insertable wireless communication device 705, 1205. In some embodiments, the data connection 262 includes one or more wires (and/or a ribbon cable) that are connected from the electronic processor 226 to one or more terminals 515, 1110 of the terminal block 505, 1105. When the insertable wireless communication device 705, 1205 is inserted into the insertable device compartment 525, the terminals 710 of the insertable wireless communication device 705, 1205 connect with one or more terminals 515 and/or 1110 of the terminal block 505, 1105 and communication between the electronic processor 226 and the insertable wireless communication device 705, 1205 is thereby enabled (for example, see FIGS. 8 and 13).

Figure 15:
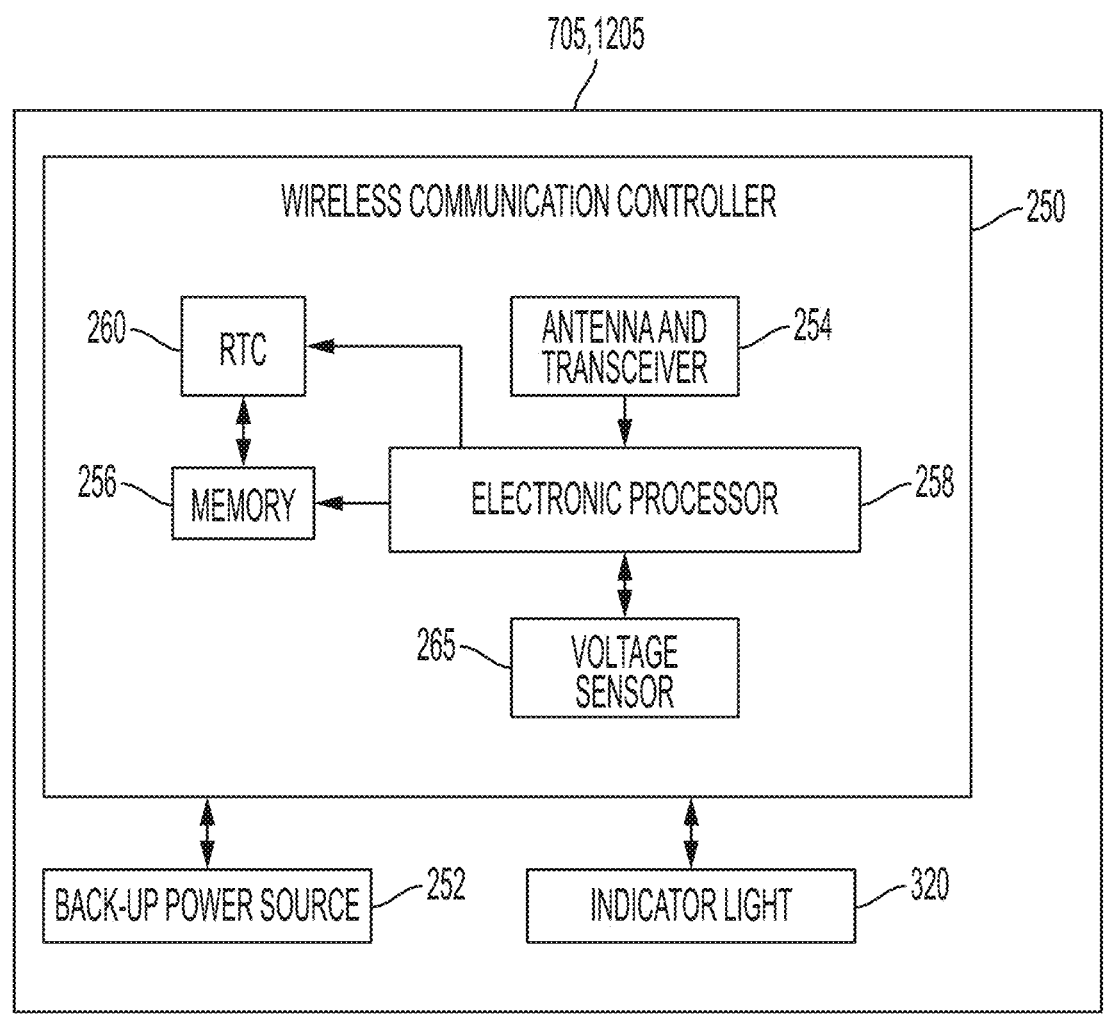
FIG. 15 illustrates a block diagram of the insertable wireless communication device of FIGS. 7A, 7B and 12 according to one example embodiment.

FIG. 15 illustrates a block diagram of the insertable wireless communication device 705, 1205 according to one example embodiment. The insertable wireless communication device 705, 1205 enables the electronic processor 226 of the power tool 104 to communicate with the external device 108 to transmit power tool data (e.g., power tool usage data, configuration data, maintenance data, and the like) and to receive power tool configuration data (e.g., settings for operating the power tool 104 in a particular mode and the like) and commands to control power tool components (e.g., turn on a work light, lock the power tool 104, and the like). As shown in FIG. 15, the insertable wireless communication device 705, 1205 includes a wireless communication controller 250, a backup power source 252 (e.g., a coin cell battery, another type of battery cell, a capacitor, or another energy storage device), and a real-time clock (RTC) 260. In some embodiments, the RTC 260 is part of the wireless communication controller 250 as shown in FIG. 15. In other embodiments, however, the RTC 260 is part of the power tool 104 and is permanently connected to the electronic processor 226. In some embodiments, the insertable wireless communication device 705, 1205 also includes an indicator light 320 (e.g., an LED that is viewable through the LED window 715 shown in FIG. 7A).

The wireless communication controller 250 includes an antenna and radio transceiver 254, a memory 256, an electronic processor 258, and the real-time clock (RTC) 260. The antenna and radio transceiver 254 operate together to send and receive wireless messages to and from an external device 108 and the electronic processor 258. The memory 256 can store instructions to be implemented by the electronic processor 258 and/or may store data related to communications between the power tool 104 and the external communication device 108 or the like. The electronic processor 258 for the wireless communication controller 250 controls wireless communications between the power tool 104 and the external device 108. For example, the electronic processor 258 associated with the wireless communication controller 250 buffers incoming and/or outgoing data, communicates with the electronic processor 226 of the power tool 104, and determines the communication protocol and/or settings to use in wireless communications. In other words, the wireless communication controller 250 is configured to receive data from the power tool electronic processor 226 and relay the information to the external device 108 via the antenna and transceiver 254. In a similar manner, the wireless communication controller 250 is configured to receive information (e.g., configuration and programming information) from the external device 108 via the antenna and transceiver 254 and relay the information to the power tool electronic processor 226.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, etc.) over a different type of wireless network. For example, the wireless communication controller 250 may be configured to communicate via Wi-Fi through a wide area network such as the Internet or a local area network, or to communicate through a piconet (e.g., using infrared or NFC communications). As another example, the wireless communication controller 250 may be configured to communicate over a cellular network (e.g., using primary transceiver 1625 of FIG. 16). The communication via the wireless communication controller 250 may be encrypted to protect the data exchanged between the power tool 104 and the external device 108 (or network) from third parties. In some embodiments, the wireless communication controller 250 includes a multi-band/multi-protocol antenna. In other words, a single antenna may be used for multiple transceivers that use different communication protocols (e.g., Bluetooth®, Wi-Fi, GPS, cellular, etc.). In such embodiments, each transceiver may selectively connect to the antenna via a respective switch, power divider, or frequency dependent impedance network.

Specific examples of communication capabilities between the power tool 104 and the external device 108 and other capabilities of the insertable wireless communication device 705, 1205 are included in U.S. patent application Ser. No. 16/056,710, which was filed Aug. 7, 2018, the contents of which are hereby incorporated by reference. In some embodiments, the wireless communication controller 250 of the insertable wireless communication device 705, 1205 functions similarly as the wireless communication controller 250 of the wireless communication device 300 described in U.S. patent application Ser. No. 16/056,710. For example, the wireless communication controller 250 is configured to periodically broadcast an identification signal for the power tool 104 that includes unique identification information stored by the power tool memory 232 and provided to the insertable wireless communication device 705, 1205 by the power tool electronic processor 226. The identification signal for the power tool 104 can then be used to track the location of the power tool 104 (see FIG. 16 and corresponding explanation of U.S. patent application Ser. No. 16/056, 710). In some embodiments, the wireless communication controller 250 broadcasts an identification signal to the external device 108, and the external device 108 determines its own location (e.g., using a GNSS receiver) and transmits the location of the external device 108 and the identification information of the power tool 104 to the server 112 over a network. Such communication using the external device 108 as the intermediary allows the approximate location of the power tool 104 to be determined because the insertable wireless communication device 705, 1205 is known to be within communication range (e.g., Bluetooth® communication range) of the external device 108 when the external device 108 receives the broadcasted identification signal from the insertable wireless communication device 705, 1205. In other embodiments, for example where the insertable wireless communication device 705, 1205 has cellular communication capabilities (see the embodiment of FIG. 16 explained below), the insertable wireless communication device 705, 1205 may be configured to communicate identification information and location information directly to the server 112 over the network without using the external device 108 as an intermediary. In such embodiments, the insertable wireless communication device 705, 1205 may include a GNSS receiver to determine its location (see FIG. 16). Such embodiments may allow for more precise location determination of the power tool 104 and do not require the external device 108 to serve as an intermediary between the insertable wireless communication device 705, 1205 and the server 112. However, such embodiments may require additional components and/or larger components in the insertable wireless communication device 705, 1205 that may take up limited space in the insertable wireless communication device 705, 1205 and in the battery pack receiving portion 206 of the power tool 104. While the above embodiments involve communication between the insertable wireless communication device 705, 1205 and the server 112 directly for tracking purposes or through the external device 108 as an intermediary for tracking purposes, such communication between any of these devices is possible for other purposes as well (e.g., storing tool usage data, retrieving stored modes and/or operational parameters to program the power tool 104, retrieving firmware updates, and the like).

As another example of a function that the wireless communication controller 250 may perform, the wireless communication controller 250 allows the power tool 104 to be locked out in response to user selection on the external device 108. In other words, the external device 108 may send a command to the power tool 104 via the wireless communication controller 250 to prevent the motor 214 from operating even in response to actuation of the trigger 212 (see FIG. 17 and corresponding explanation of U.S. patent application Ser. No. 16/056,710). Such a command may control the power tool 104 to immediately lock out or to lock out at a future time. In some embodiments, the insertable wireless communication device 705, 1205 may lock out (i.e., disable) the power tool 104 by preventing communications between the battery pack 207 and the power tool 104 or by sending a lock command to the electronic processor 226 instructing the electronic processor to not drive the motor 214 in response to actuation of the trigger 212. As another example of a function that the wireless communication controller 250 may perform, the wireless communication controller 250 may be configured to be electronically irremovable from the power tool 104 such that the power tool 104 is unable to operate if the insertable wireless communication device 705, 1205 is removed from the power tool 104 (see FIGS. 29-31 and corresponding explanation of U.S. patent application Ser. No. 16/056,710).

The RTC 260 increments and keeps time independently of the other power tool components. In the illustrated embodiment, the RTC 260 is powered through the wireless communication controller 250 when the wireless communication controller 250 is powered. In some embodiments, however, the RTC 260 is a separate component from the wireless communication controller 250 and may be integrated into the power tool 104. In such embodiments, the RTC 260 receives power from the battery pack 207 (e.g., a main or primary power source) when the battery pack 207 is connected to the power tool 104. The RTC 260 receives power from the backup power source 252 (e.g., a coin cell battery, another type of battery cell, a capacitor, or another energy storage device) when the battery pack 207 is not connected to the power tool 104. Therefore, the RTC 260 keeps track of time regardless of whether the power tool 104 is in operation, and regardless of whether the battery pack 207 is connected to the power tool 104. When no power source is present (i.e., the battery pack 207 is detached from the power tool 104 and the backup power source 252 is removed or depleted), the RTC 260 stores the last valid time. When a power source is replaced (i.e., the battery pack 207 is attached to the power tool 104 and/or the backup power source 252 is replaced), the RTC 260 uses the stored time as a starting point to resume keeping time.

The starting time for the RTC 260 is set to current Greenwich Mean Time (GMT) time at the factory at time of manufacture. The time is updated or synchronized whenever the wireless communication controller 250 communicates with the external device 108. Because GMT time is independent of calendar, seasons, or time schemas, using GMT time allows the power tool 104 or the external device 108 to convert from time indicated by the RTC 260 to localized time for display to the user.

The backup power source 252 also provides power to the RTC 260 to enable continuous tracking of time. In some embodiments, the backup power source 252 does not provide power to energize the motor 214, drive the drive device 210, or power the power tool electronic processor 226, and generally only powers the wireless communication controller 250, the indicator light 320, and the RTC 260 (e.g., in embodiments in which the RTC 260 is separate from the wireless communication controller 250) when the battery pack 207 is not attached to the power tool 104. In other embodiments, the backup power source 252 also provides power to low-power elements such as, for example, LEDs, and the like. In some embodiments, the backup power source 252 also provides power to the power tool electronic processor 226 to allow the power tool electronic processor 226 to communicate with the external device 108 when the battery pack 207 is not coupled to the power tool 104. In some embodiments, the wireless communication controller 250 includes a voltage sensor 265 (see FIG. 15) coupled to the backup power source 252. The wireless communication controller 250 uses the voltage sensor 265 to determine the state of charge of the backup power source 252. The wireless communication controller 250 may include the state of charge of the backup power source 252 in the identification message that is periodically broadcasted to the external device 108. The user can then be alerted by the external device 108 when the state of charge of the backup power source 252 is low.

In the illustrated embodiment, the backup power source 252 includes a coin cell battery located on the PCB 730. The coin cell battery is merely an example power source. In some embodiments, the backup power source 252 may be another type of battery cell, a capacitor, or another energy storage device. The coin cell battery provides sufficient power to allow the wireless communication controller 250 to broadcast at least minimal identification information. In the illustrated embodiment, the coin cell battery can run for several years by allowing the power tool 104 to only "broadcast" or "advertise" once every few seconds when operating the advertisement state. However, as noted above, in some embodiments, the backup power source 252 provides power to the power tool electronic processor 226 to allow the power tool electronic processor 226 to communicate with the external device 108 when the battery pack 207 is not coupled to the power tool 104.

In some embodiments, the coin cell battery is a primary (i.e., non-rechargeable) backup battery. In other embodiments, the backup power source 252 includes a secondary (rechargeable) backup battery cell or a capacitor. In such embodiments, the battery pack 207 provides charging power to recharge the secondary backup battery cell or the capacitor. For example, the power input unit 224 may include charging circuitry to charge the backup power source 252. The rechargeable cell and capacitor may be sized to provide power for several days or weeks before needing to recharge. While FIG. 14 shows the power input unit 224 as a component of the power tool 104 that provides power received from the battery pack 207 to the insertable wireless communication device 705, 1205, in some embodiments, the insertable wireless communication device 705, 1205 includes its own separate power input unit that is similar to the power input unit 224. For example, the power input unit of the insertable wireless communication device 705, 1205 includes combinations of active and passive components (e.g., voltage step-down controllers, voltage converters, rectifiers, filters, etc.) to regulate or control the power received through the terminals 710 of the insertable wireless communication device 705, 1205 from the battery pack 207 and provided to the components of the insertable wireless communication device 705, 1205. In embodiments where the insertable wireless communication device 705, 1205 includes its own power input unit, additional power conditioning circuitry specifically designed for the insertable wireless communication device 705, 1205 is not necessary to include in the power tool 104 because the insertable wireless communication device 705, 1205 is directly coupled to the elongated terminals 515 of the terminal block 505, 1105 that are also coupled to the battery pack 207. Accordingly, there may be less wires and circuit components included within the housing of the power tool 104, which can save space within the housing of the power tool 104.

The indicator light 320 of the insertable wireless communication device 705, 1205 is configured to indicate the state of the insertable wireless communication device 705, 1205. For example, the indicator light 320 may, in a first indication state, light in a first color (or blink in a first predetermined pattern) to indicate that the insertable wireless communication device 705, 1205 is currently communicating with an external device 108. The indicator light 320 may, in a second indication state, light in a second color (or blink in a second predetermined pattern) to indicate that the power tool 104 is locked (e.g., the motor 214 is inoperable because a security feature has been enabled) as described above and with respect to FIG. 16 of U.S. patent application Ser. No. 16/056,710. For example, when the motor 214 is inoperable because a security feature has been enabled, the indicator light 320 may blink in a predetermined pattern or otherwise illuminate in response to the trigger 212 being actuated to indicate to the user that the power tool 104 has been locked out. Finally, the indicator light 320 may also light to indicate a level of charge of the backup power source 252. In one example, the indicator light 320 may, in a third indication state, light in a third color (or blink in another predetermined pattern) when the state of charge of the backup power source 252 drops below a predetermined threshold. In some embodiments, the wireless communication controller 250 may control the indicator light 320 based on the signals received from the voltage sensor 265.

Figure 16:
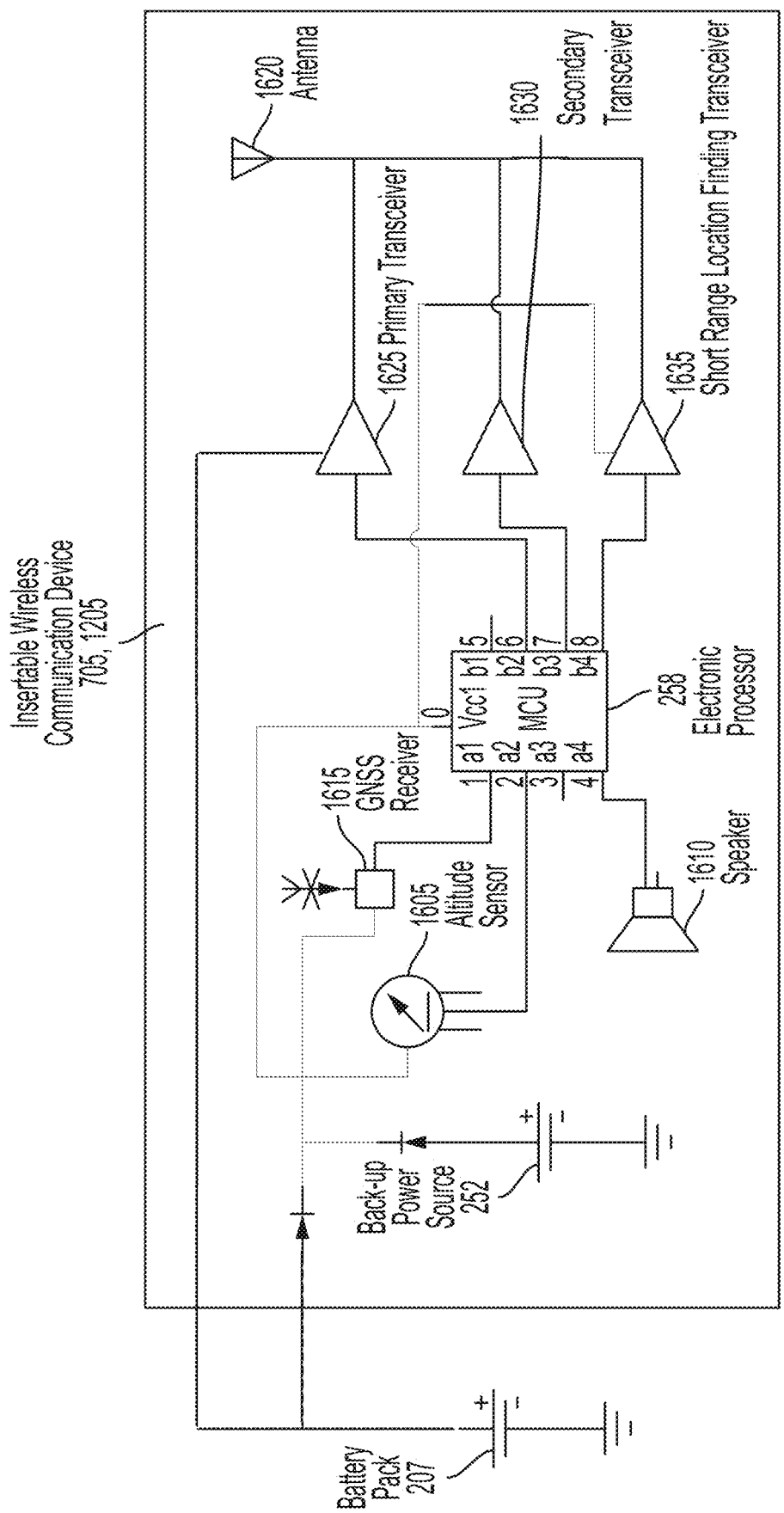
FIG. 16 illustrates a schematic diagram of the insertable wireless communication device of FIGS. 7A, 7B and 12 according to another example embodiment.

In some embodiments, the insertable wireless communication device 705, 1205 includes more or fewer components than those shown in FIG. 15. For example, the insertable wireless communication device 705, 1205 may include an accelerometer, a gyroscope, and/or subscriber identity module (SIM) card. As another example of the insertable wireless communication device 705, 1205 including more or fewer components than those shown in FIG. 15, FIG. 16 illustrates a schematic diagram of the insertable wireless communication device 705, 1205 according to another example embodiment. As shown in FIG. 16, the insertable wireless communication device 705, 1205 additionally includes an altitude sensor 1605 to detect an altitude at which the power tool 104 is located (e.g., a pressure sensor). In some embodiments, the sensed altitude of the power tool 104 is used in combination with global positioning system (GPS) information determined by a Global Navigation Satellite System (GNSS) receiver 1615 to track the location of the power tool 104. For example, using GPS information determined by the GNSS receiver 1615 or by a nearby external device 108 that is within communication range of the insertable wireless communication device 705, 1205 (as explained above with respect to FIG. 15 where the external device 108 acts as an intermediary between the power tool 104 and the server 112), the insertable wireless communication device 705, 1205 and/or the external device 108 may determine that the power tool 104 is located in a building with fifteen stories. For example, a latitude and longitude determination from the GNSS receiver 1615 may indicate that the power tool 104 is located at the same latitude and longitude as the fifteen story building. Using altitude information determined by the altitude sensor 1605, the insertable wireless communication device 705, 1205 and/or the external device 108 may determine that the power tool 104 is located at a height corresponding to the ninth floor of the building. To make such a determination as described in the previous example, the insertable wireless communication device 705, 1205 and/or the external device 108 may communicate with a mapping server or another third party server that stores building location information (e.g., the latitude and longitude of different buildings) and building metric information (e.g., number of floors, heights of each floor, and the like). In some embodiments, the altitude sensor 1605 may not be located in the insertable wireless communication device 705, 1205 and may be included inside the housing of the power tool 104.

In some embodiments, the insertable wireless communication device 705, 1205 additionally includes a speaker 1610 (or a buzzer) to output sound as feedback to the user. For example, using the external device 108, a user may track the location of the power tool 104 to a certain area but still may be unable to locate the precise location of the power tool 104. In such situations, the user may provide a user input on the external device 108 that causes the external device 108 to command the insertable wireless communication device 705, 1205 of the power tool 104 to emit a sound from the speaker 1610 (or buzzer) to assist the user in locating the power tool 104.

As shown in FIG. 16, in some embodiments, the insertable wireless communication device 705, 1205 includes multiple transceivers 1625, 1630, and 1635. In some embodiments, the insertable wireless communication device 705, 1205 includes a primary transceiver 1625 (e.g., circuitry to allow for LTE CAT-M communication), a secondary transceiver 1630 (e.g., a Bluetooth® transceiver, a WiFi transceiver, or the like), and a short range location finding transceiver 1635 (e.g., circuitry to allow for Ultra-Wide Band communication). In some embodiments, one or more of the transceivers 1625, 1630, and 1635 share an antenna 1620. In some embodiments, the primary transceiver 1625 communicates a location of the insertable wireless communication device 705, 1205 as determined by the GNSS receiver 1615 and the altitude sensor 1605 directly to the server 112 as described in one of the above examples with respect to FIG. 15. In some embodiments, the secondary transceiver 1630 communicates an altitude of the power tool 104 and identification information of the power tool 104 to the external device 108. The external device 108 acts as an intermediary and determines its own location information and transmits the location of the external device 108, the altitude of the power tool 104, and the identification information of the power tool 104 to the server 112 as described in another of the above examples with respect to FIG. 15. In some embodiments, the secondary transceiver 1630 is also used to provide tool data to the external device 108 and allow a user to adjust operational parameters of the power tool 104 and send commands to the power tool 104 using the external device 108. In some embodiments, the short range location finding transceiver 1635 is used to determine a precise location of the power tool 104 relative to the user when the user is located in the general vicinity of the power tool 104 but is still unable to precisely locate the power tool 104. For example, the external device 108 may display a direction in which the user should move to find the power tool 104. For example, the short range location finding transceiver 1635 may use ultra-wideband (UWB) location finding to determine the location of the power tool 104 relative to the external device 108. In particular, a UWB receiver on the external device 108 may receive multiple beacon signals from the short range location finding transceiver 1635 as the user moves the external device 108 within a room. The electronic processor 114 of the external device 108 may determine a distance between the insertable wireless communication device 705, 1205 and the external device 108 for each received beacon signal. Using these distance determinations and an accelerometer, gyroscope, GPS, or the like to keep track of the location of the external device 108 as it moves within the room, the electronic processor 114 of the external device 108 may triangulate the location of the insertable wireless communication device 705, 1205. The external device may then display the direction in which the user should move to find the power tool 104 to which the insertable wireless communication device 705, 1205 is attached. In some embodiments, the back-up power source 252 powers the secondary transceiver 1630 (i.e., a Bluetooth® transceiver) when the battery pack 207 is not coupled to the power tool 104. In some embodiments, the primary transceiver 1625 is powered by the battery pack 207 when the battery pack 207 is coupled to the power tool 104 and is not powered when the battery pack 207 is not coupled to the power tool 104.

In some embodiments, the insertable wireless communication device 705, 1205 includes more or fewer components than those shown in FIG. 16. For example, the insertable wireless communication device 705, 1205 may also include one or more of the memory 256, the RTC 260, the voltage sensor 265 and the indicator light 320 as described above with respect to FIG. 15. Although FIG. 16 only shows connections to the battery pack 207 from the insertable wireless communication device 705, 1205, in some embodiments, the insertable wireless communication device 705, 1205 includes additional connections to the battery pack 207 and/or the power tool 104. For example, the insertable wireless communication device 705, 1205 is additionally connected to the power tool 104 (e.g., to communicate with the power tool electronic processor 226). Such connections may be made via the terminals 710 of the insertable wireless communication device 705, 1205 as explained previously herein.

Figure 17A:
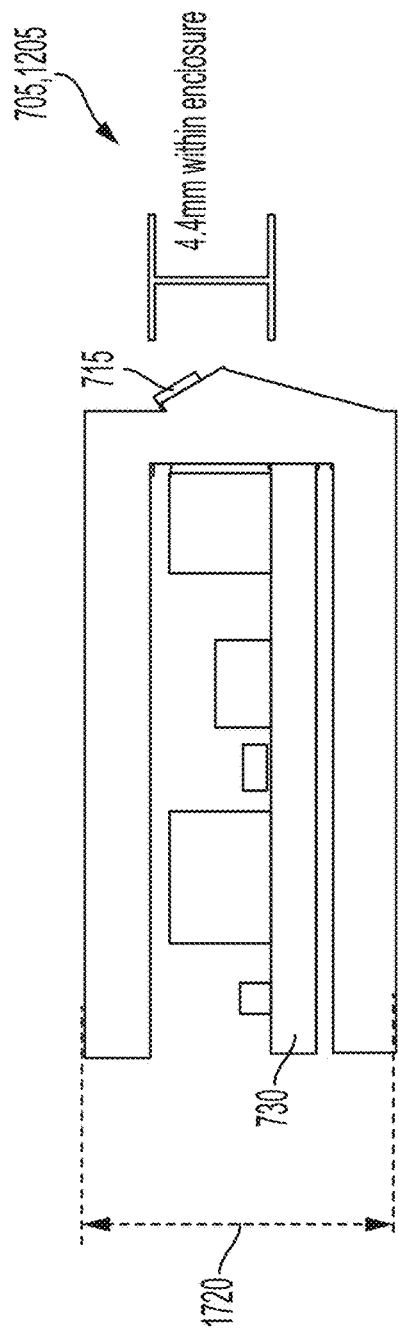
FIG. 17A is a side profile view of the insertable wireless communication device of FIGS. 7A, 7B and 12 according to one example embodiment.
Figure 17B:
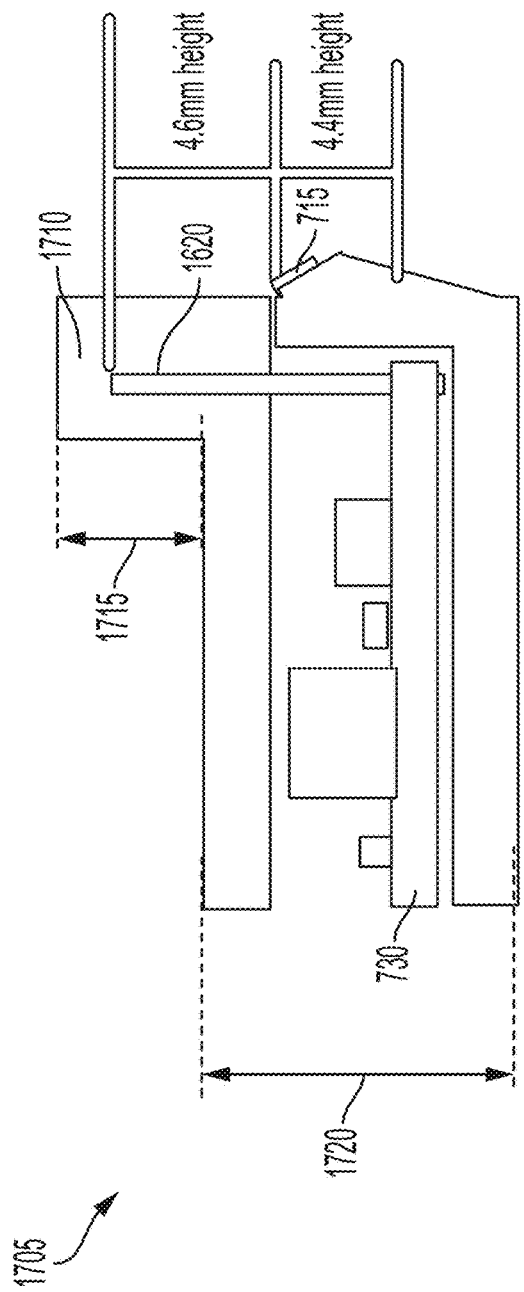
FIG. 17B is a side profile view of an insertable wireless communication device according to another example embodiment.

FIG. 17A is a side profile view of the insertable wireless communication device 705, 1205. FIG. 17B is a side profile view of an insertable wireless communication device 1705 that is similar to the insertable wireless communication devices 705 and 1205, and the previous description thereof applies to the wireless communication device 1705 except that the wireless communication device 1705 is modified with an increased height at the back (i.e., rear) of the insertable wireless communication device 1705 to allow additional space for an antenna (e.g., a cellular antenna such as the antenna 1620). As shown in FIG. 17A, approximately 4.4 millimeters of space exists between the top surface of the PCB 730 and the top of the housing of the insertable wireless communication device 705, 1205. In some situations (e.g., when the antenna 1620 is configured to allow for cellular communications), additional space above the PCB 730 may be included to accommodate the antenna 1620. As shown in FIG. 17B, a back portion of the insertable wireless communication device 1705 may have an increased height to allow the antenna 1620 to extend further upward (see extended housing portion 1710). In some embodiments, the extended housing portion 1710 has a height 1715 of between approximately two and approximately six millimeters compared to a height 1720 of a main body of the insertable wireless communication device 1705 that is approximately twelve millimeters. In some embodiments the extended housing portion 1710 is less than or equal to 50% or less than or equal to 25% of the length of the insertable wireless communication device 1705 along an axis of insertion into the insertable device compartment 525. Because the extended housing portion 1710 is located on the back (i.e., rear) of the insertable wireless communication device 1705, the remainder of the insertable wireless communication device 1705 is able to remain small in height in order to reduce the increase in height of the battery pack receiving portion 206, the terminal block 505, 1105, and the terminals 515 resulting from accommodating the insertable device compartment 525 and the insertable wireless communication device 1705. In some embodiments, a total height (i.e., thickness) of the insertable wireless communication device 1705 including the extended housing portion 1710 is less than approximately one inch (i.e., less than approximately twenty-five millimeters), is less than approximately twenty millimeters, is less than approximately fifteen millimeters, is between ten and twenty-five millimeters, is between ten and twenty millimeters, or is between ten and fifteen millimeters. In some embodiments, the extended housing portion 1710 does not extend into the insertable device compartment 525 of the power tool 104. Rather, the extended housing portion 1710 may reside outside the insertable device compartment 525 adjacent an outer surface of the housing of the power tool 104 to reduce the increase in height of the battery pack receiving portion 206, the terminal block 505, 1105, and the terminals 515 resulting from accommodating the insertable device compartment 525 and the insertable wireless communication device 1705. In some embodiments, the antenna 1620 is a laser direct structuring (LDS) antenna that is located on an internal surface of the housing of the insertable wireless communication device 1705 within the extended housing portion 1710 and that may take up less space than other types of antennas.

FIGS. 18A-18C illustrate an insertable wireless communication device 1805 and terminal block 1810 according to another example embodiment. The insertable wireless communication device 1805 and the terminal block 1810 are respectively similar to the insertable wireless communication device 705, 1205, 1705 and the terminal block 505, 1105, and the previous descriptions thereof respectively applies to the insertable wireless communication device 1805 and the terminal block 1810 except for the differences described below. FIG. 18A is a perspective view of the insertable wireless communication device 1805. In some embodiments, the insertable wireless communication device 1805 includes arms 1815 that extend from a front of the insertable wireless communication device 1805 to secure the insertable wireless communication device 1805 to the terminal block 1810 of the power tool 104. In the embodiment shown, the arms 1815 includes holes 1820 that each receive a fastener 1825 through a hole on the housing of the battery pack receiving portion 206 (see FIG. 18C). As shown in perspective view of FIG. 18B where the outer walls of the terminal block 1810 are shown partially transparently to allow the inside of the terminal block 1810 to be viewed, the terminal block 1810 may also include holes 1830 to respectively receive the fasteners 1825 to secure the insertable wireless communication device 1805 to the terminal block 1810. For example, the holes 1830 and the fasteners 1825 are each threaded such that the fasteners 1825 threadingly engage the holes 1830 when rotationally inserted therein.

In some embodiments, the insertable wireless communication device 1805 may be removed by a user by removing the fasteners 1825. However, in other embodiments, the insertable wireless communication device 1805 is not intended to be removed by a user once the insertable wireless communication device 1805 is installed in the insertable device compartment 525 but may be removable by authorized personnel at a service center using a specialized tool configured to remove the fasteners 1825. In some embodiments, one or more terminals of the terminal block 1810 include holes or cutouts 1835 that allow the fastener 1825 to pass through a plane in which the terminal lies. As shown in FIG. 18B, in some embodiments, the terminal block 1810 includes a number of short terminals 1837 configured to electrically and physically connect to the terminals of the insertable wireless communication device 1805 and a number of longer terminals 1838 configured to electrically and physically connect to the terminals of the battery pack 207. As shown in FIG. 18B, in order to reach the terminals of the battery pack 207, the longer terminals 1838 may extend through a plane in which the insertable wireless communication device 1805 is inserted into the battery pack receiving portion 206. In some embodiments, one or more of the longer terminals 1838 are configured to additionally electrically and physically connect to the terminals of the insertable wireless communication device 1805. Such longer terminals 1838 may be referred to as shared terminals. In some embodiments, a shared terminal may include varying size, shape, and location such that a first portion of the shared terminal that is connected to a device terminal of the insertable wireless communication device 1805 may include a different size or shape or may be located in a different plane than a second portion of the shared terminal that is connected to a battery terminal of the battery pack 207. In some embodiments, one or more of the longer terminals 1838 are configured not to connect to the terminals of the insertable wireless communication device 1805. Such longer terminals 1838 may be referred to as unshared terminals.

In some embodiments, the insertable wireless communication device 1805 includes a protrusion 1840 on the rear side of its upper surface as shown in FIG. 18A. In some embodiments, the protrusion 1840 may provide additional space for an antenna (e.g., a cellular antenna such as the antenna 1620). In some embodiments, the protrusion 1840 is less than or equal to 50% or less than or equal to 25% of the length of the insertable wireless communication device 1805 along an axis of insertion into the insertable device compartment 525. In some embodiments, the insertable wireless communication device 1805 includes a tab 1845 protruding from a lower surface of the insertable wireless communication device 1805. The tab 1845 may aid a user in removing the insertable wireless communication device 1805 from the battery pack receiving portion 206. Although not shown in FIGS. 18A and 18C, in some embodiments, the insertable wireless communication device 1805 may include an LED and the LED window 715 as shown on the insertable wireless communication device 705, 1205, 1705.

Figure 20:
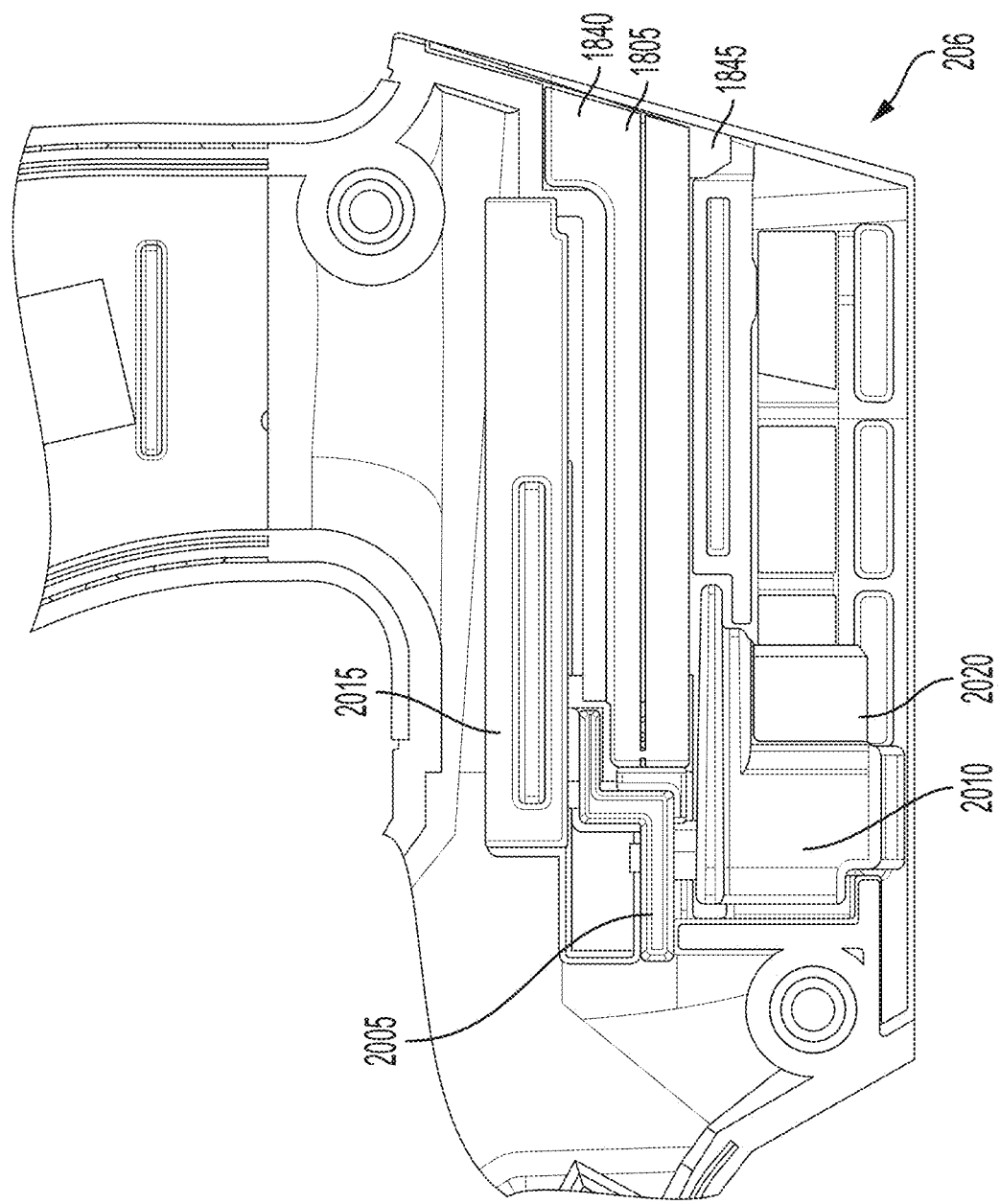
FIG. 20 illustrates a side profile view of the battery pack receiving portion of the power tool of FIG. 3 where a terminal block for an insertable wireless communication device is separate from a terminal block for the battery pack according to one example embodiment.

Although FIGS. 18A-18C show a shared terminal block 1810 that includes terminals configured to electrically and physically connect to terminals of both the insertable wireless communication device 1805 and the battery pack 207, in some embodiments, the power tool 104 may include two separate terminal blocks. For example, the power tool 104 may include a terminal block for the insertable wireless communication device 1805 located directly above a terminal block for the battery pack 207 in the same general configuration as the terminal block 1810 shown in FIGS. 18B and 18C. FIG. 20 illustrates a side profile view of an embodiment of the battery pack receiving portion 206 of the power tool 104 where a terminal block 2005 for the insertable wireless communication device 1805 is separate from a terminal block 2010 for the battery pack 207. As shown in FIG. 20, the terminal block 2005 configured to receive the insertable wireless communication device 1805 includes a z-shaped structure when viewed from its side profile. This z-shaped structure may allow for improved alignment and general ease of assembly during manufacturing. The terminal block 2005 is located above the terminal block 2010 and below an internal housing 2015 (e.g., a potting boat) that may house a PCB (e.g., a control PCB that includes an electronic processor configured to control one or more functions of the power tool 104 such as controlling the FETs to drive the motor 214). The terminal block 2010 includes terminals 2020 that are configured to physically and electrically connect to battery terminals of the battery pack 207. The terminal block 2005 also includes terminals that are not shown in FIG. 20 because the insertable wireless communication device 1805 is shown as connected to these terminals and obstructing the view thereof.

Figure 19B:
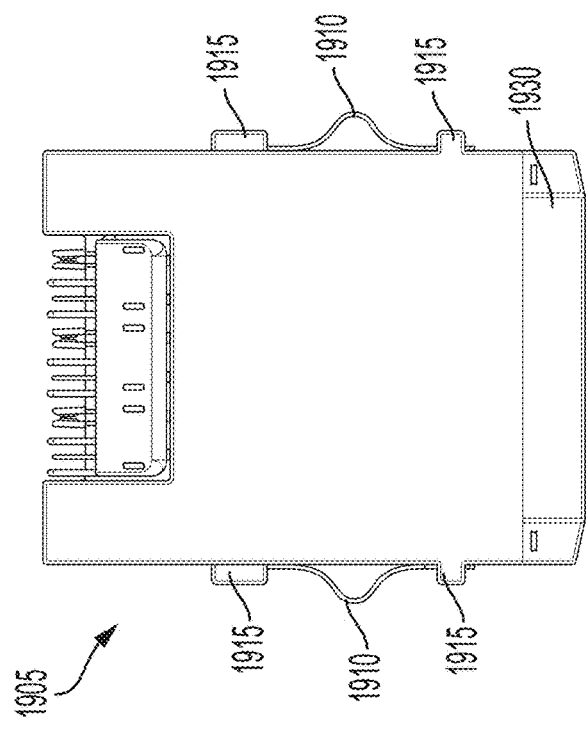
FIG. 19B is a top view of the insertable wireless communication device of FIG. 19A according to one example embodiment.
Figure 19D:
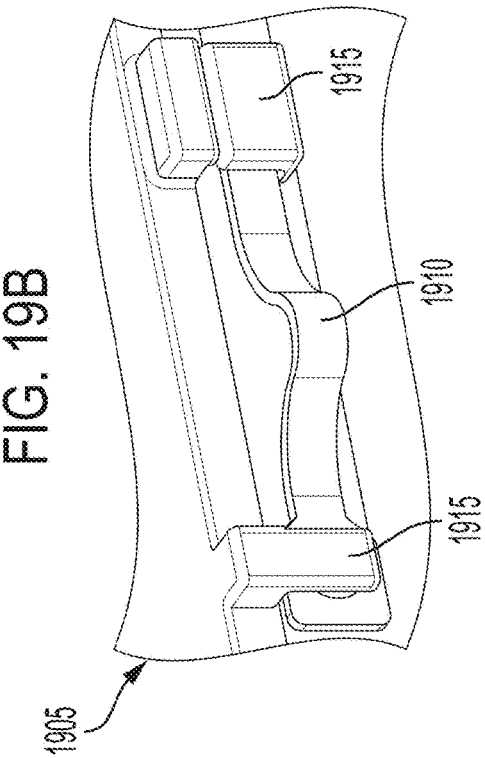
FIG. 19D is a zoomed-in perspective view of a side wall of the insertable wireless communication device of FIG. 19A according to one example embodiment.
Figure 19A:
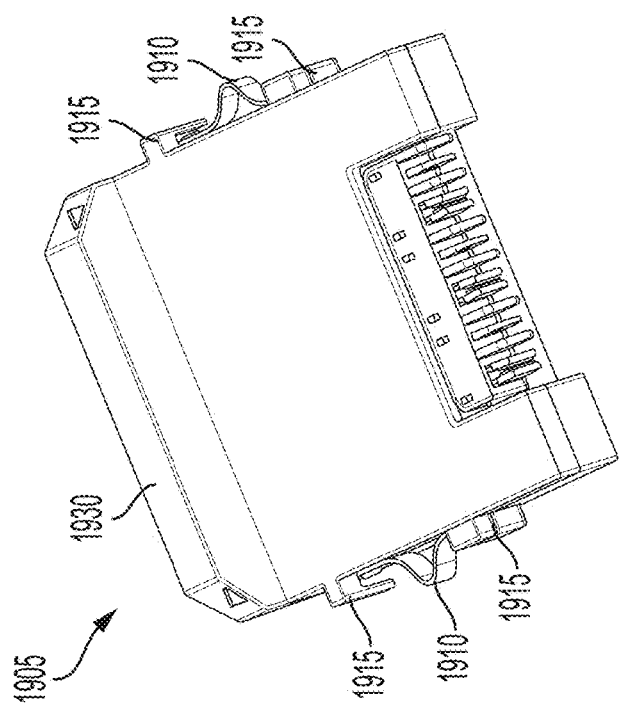
FIG. 19A is a perspective view of an insertable wireless communication device according to another example embodiment.
Figure 19C:
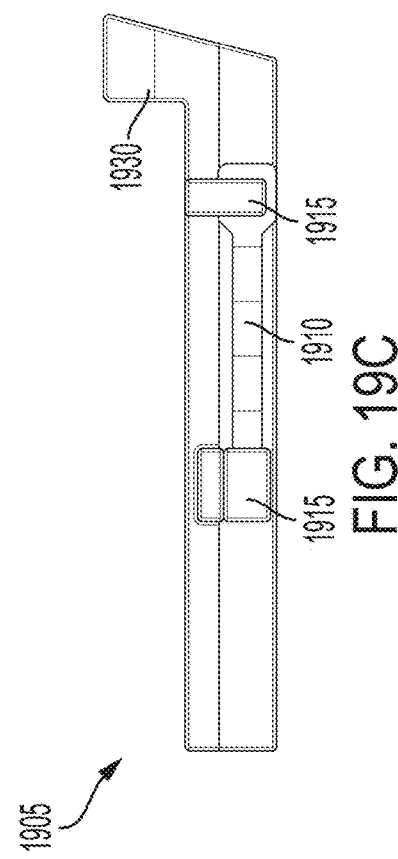
FIG. 19C is a side view of the insertable wireless communication device of FIG. 19A according to one example embodiment.
Figure 19E:
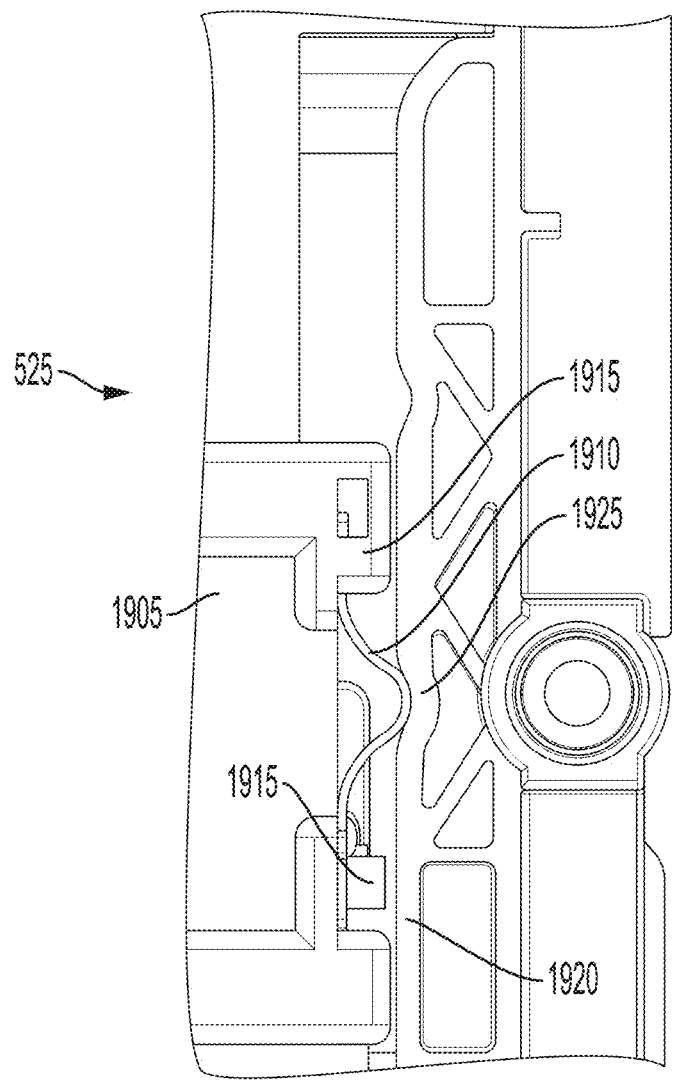
FIG. 19E illustrates the insertable wireless communication device of FIG. 19A inserted into an insertable device compartment of a power tool according to one example embodiment.

FIGS. 19A-19E illustrate an insertable wireless communication device 1905 according to another example embodiment. The insertable wireless communication device 1905 is similar to the insertable wireless communication device 705, 1205, 1705, 1805 and the previous descriptions thereof apply to the insertable wireless communication device 1905 except for the differences described below. FIG. 19A is a perspective view of the insertable wireless communication device 1905. FIG. 19B is a top view of the insertable communication device 1905, and FIG. 19C is a side view of the insertable communication device 1905. In some embodiments, the insertable wireless communication device 1905 includes a spring 1910 secured to side walls of the insertable wireless communication device 1905 via spring securement features 1915 (e.g., clips, holders, etc.). For example, FIG. 19D is a zoomed-in perspective view of a side wall of the insertable wireless communication device 1905. In some embodiments, the springs 1910 flex inward when the insertable wireless communication device 1905 is inserted into the insertable device compartment 525. For example, as the insertable wireless communication device 1905 is inserted into the insertable device compartment 525, walls 1920 of the insertable device compartment 525 cause the springs 1910 to flex inward toward the side walls of the insertable wireless communication device 1905. The walls 1920 of the insertable device compartment 525 include detents 1925 that allow the springs 1910 to relax back to its original shape (i.e., unflex and extend away from the side walls of the insertable wireless communication device 1905). For example, FIG. 19E shows the spring 1910 relaxed in the detent 1925 of the wall 1920 of the insertable device compartment 525. In some embodiments, the spring 1910 is partially relaxed when in the detent 1925 (i.e., the spring 1910 does not relax fully back to its original shape), and does not extend outwardly as much as when the wireless communication device 1905 is outside of the insertable device compartment 525. In the configuration shown in FIG. 19E, the spring 1910 secures the insertable wireless communication device 1905 in the insertable device compartment 525. However, because the spring 1920 includes smooth, rounded edges rather than sharp edges, the insertable wireless communication device 1905 may be removed from the insertable device compartment 525 in a similar manner as how it is inserted. In other words, a user may be able to pull the insertable wireless communication device 1905 with enough force such that the springs 1910 flex inward and allow the insertable wireless communication device 1905 to be removed from the insertable device compartment 525.

As shown in FIGS. 19A-19C, in some embodiments, the insertable wireless communication device 1905 includes a protrusion 1930 that may be similar to the protrusion 1840 explained above with respect to FIGS. 18A-18C. Although FIGS. 19A-19D show the insertable wireless communication device 1905 including two springs 1910 (one on each side wall of the insertable wireless communication device 1905), in some embodiments, the insertable wireless communication device 1905 may include the spring 1910 on only one of the two side walls of the insertable wireless communication device 1905.

Figure 21:
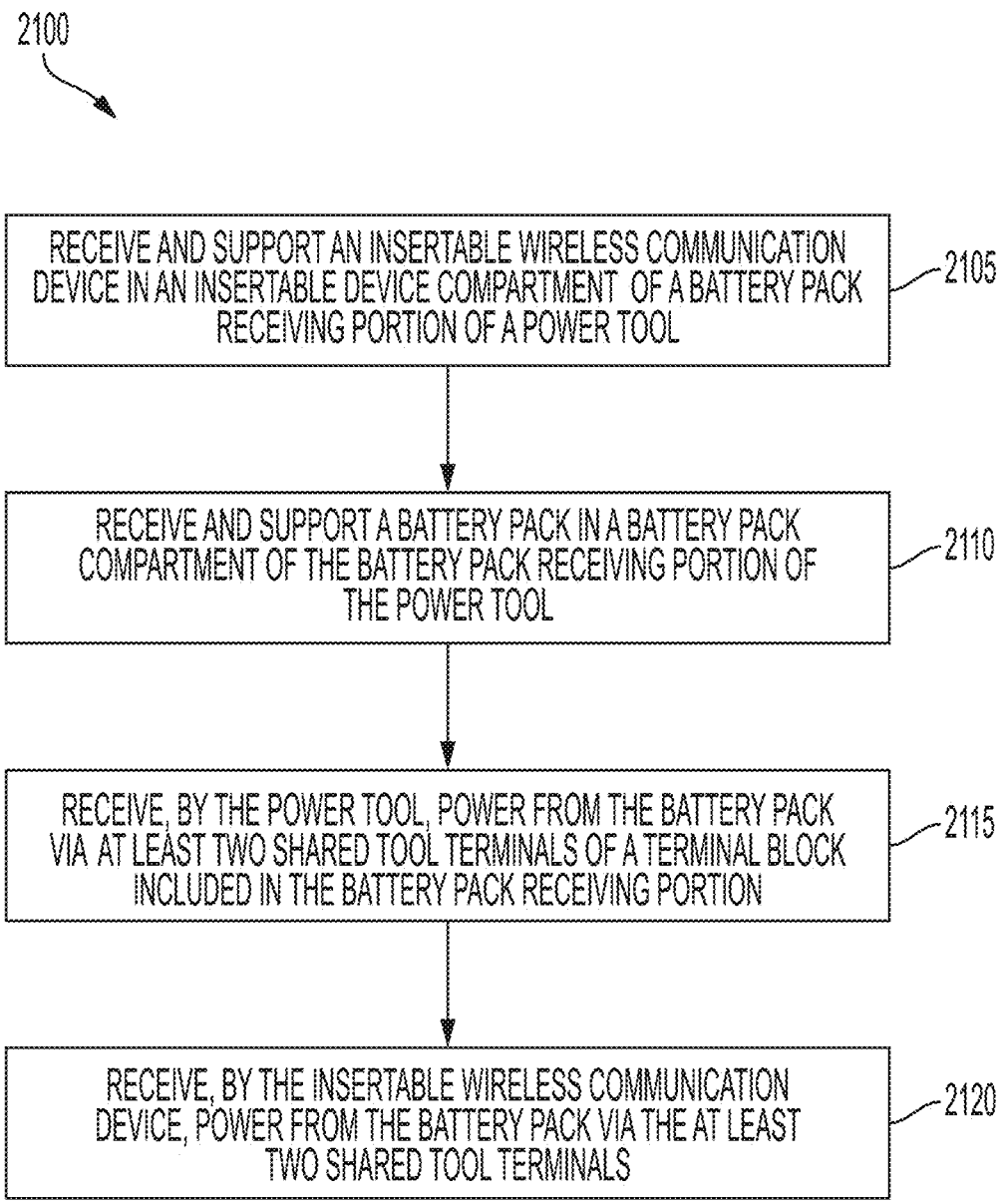
FIG. 21 is a flowchart illustrating a method of operating the power tool of FIG. 3 according to one example embodiment.

FIG. 21 is a flowchart illustrating a method 2100 of operating the power tool 104 that includes an insertable device compartment 525 according to one or more of the embodiments explained herein. At block 2105, the insertable device compartment 525 of the battery pack receiving portion 206 of the power tool 104 receives and supports an insertable wireless communication device 705, 1205, 1705, 1805, 1905. At block 2110, a battery pack compartment 535 of the battery pack receiving portion 206 of the power tool 104 receives and supports a battery pack 207. At block 2115, the power tool 104 receives power from the battery pack 207 via at least two shared tool terminals of a terminal block included in the battery pack receiving portion 206. At block 2120, the insertable wireless communication device 705, 1205, 1705, 1805, 1905 receives power from the battery pack 207 via the at least two shared tool terminals of the terminal block. In other words, the method 2100 allows power to be received by both the power tool 104 and the insertable wireless communication device 705, 1205, 1705,

1805, 1905 over shared terminals of the terminal block. As explained previously herein, shared terminals may additionally or alternatively be used for other purposes (e.g., communicating data to/from the power tool 104, the battery pack 207, and/or the insertable wireless communication device 705, 1205, 1705, 1805, 1905).

Thus, the invention provides, among other things, a power tool including a compartment that receives an insertable wireless communication device that shares a terminal block with the battery pack of the power tool.

We claim:

1. An insertable wireless communication device comprising:
   an insertable device housing configured to be inserted into a power tool housing of a power tool from an exterior of the power tool housing;
   a shared antenna located within the insertable device housing and configured to transmit and receive wireless signals;
   a first transceiver located within the insertable device housing and configured to communicate, via the shared antenna, with a server using a first type of wireless communication; and
   a second transceiver located within the insertable device housing and configured to communicate, via the shared antenna, with an external device using a second type of wireless communication, wherein the second type of wireless communication has a different communication range than the first type of wireless communication.

2. The insertable wireless communication device of claim 1, further comprising:
   a location receiver configured to determine location information for the insertable wireless communication device;
   an altitude sensor configured to determine altitude information related to an altitude at which the insertable wireless communication device is located; and
   an electronic processor located within the insertable device housing and coupled to the location receiver and to the altitude sensor, the electronic processor configured to:
      receive the location information from the location receiver,
      receive the altitude information from the altitude sensor, and
      determine a location of the insertable wireless communication device based on the location information and the altitude information.

3. The insertable wireless communication device of claim 2, wherein the location information includes an indication that the location of the insertable wireless communication device corresponds to a particular floor of a particular building.

4. The insertable wireless communication device of claim 1, wherein the first transceiver is configured to transmit, via the shared antenna, a location of the insertable wireless communication device to the server without using the external device as an intermediary; and
   wherein the second transceiver is configured to transmit, via the shared antenna, tool data to the external device and is configured to receive, via the shared antenna and from the external device, a command to control an operation of the power tool.

5. The insertable wireless communication device of claim 4, wherein the command includes a first command to control a work light of the power tool or a second command to lock the power tool to prevent the power tool from operating.

6. The insertable wireless communication device of claim 4, wherein the operation of the power tool includes an operation of a motor of the power tool, and wherein the command includes power tool configuration data to control the operation of the motor of the power tool.

7. The insertable wireless communication device of claim 1, further comprising:
   a backup power source located within the insertable device housing;
   wherein the first transceiver is configured to be powered by a battery pack coupled to the power tool, and the first transceiver is configured to be unpowered when the battery pack is not coupled to the power tool; and
   wherein the second transceiver is configured to be powered by the backup power source when the battery pack is not coupled to the power tool.

8. The insertable wireless communication device of claim 1, further comprising:
   an electronic processor located within the insertable device housing and coupled to the first transceiver and the second transceiver, the electronic processor is configured to:
      communicate with the server via the first transceiver and the shared antenna; and
      communicate with the external device via the second transceiver and the shared antenna.

9. The insertable wireless communication device of claim 1, wherein the insertable wireless communication device is configured to be communicatively coupled to a power tool electronic processor of the power tool after the insertable wireless communication device is inserted into the power tool housing;
   wherein the insertable wireless communication device is configured to:
      receive tool data from the power tool electronic processor, and
      transmit the tool data to the server, the external device, or both the server and the external device; and
   wherein the insertable wireless communication device is configured to:
      receive, via the shared antenna and from the external device, a command to control an operation of the power tool, and
      transmit the command to the power tool electronic processor to control the power tool according to the command.

10. The insertable wireless communication device of claim 1, wherein:
    the first type of wireless communication includes cellular communication; and
    the second type of wireless communication includes short range radio frequency communication.

11. The insertable wireless communication device of claim 1, further comprising:
    a third transceiver located within the insertable device housing, the third transceiver configured to transmit, via the shared antenna, a beacon signal to the external device to aid the external device in determining a location of the insertable wireless communication device relative to the external device.

12. A method of controlling an insertable wireless communication device, the method comprising:
    communicating, using a first transceiver located within an insertable device housing of the insertable wireless communication device and via a shared antenna located within the insertable device housing, with a server using a first type of wireless communication, the insertable wireless communication device being inserted into a power tool housing of a power tool from an exterior of the power tool housing; and communicating, using a second transceiver located within the insertable device housing and via the shared antenna, with an external device using a second type of wireless communication, wherein the second type of wireless communication has a different communication range than the first type of wireless communication.

13. The method of claim 12, wherein communicating with the server includes transmitting, with the first transceiver via the shared antenna, a location of the insertable wireless communication device to the server without using the external device as an intermediary; and wherein communicating with the external device includes:
transmitting, with the second transceiver via the shared antenna, tool data to the external device, and
receiving, with the second transceiver and via the shared antenna, a command to control an operation of the power tool from the external device.

14. The method of claim 12, further comprising:
powering the first transceiver by a battery pack coupled to the power tool when the battery pack is coupled to the power tool, the first transceiver being unpowered when the battery pack is not coupled to the power tool; and
powering the second transceiver by a backup power source located within the insertable device housing when the battery pack is not coupled to the power tool.

15. The method of claim 12, further comprising:
communicating, using an electronic processor located within the insertable device housing and coupled to the first transceiver and the second transceiver, with the server via the first transceiver and the shared antenna; and
communicating, using the electronic processor, with the external device via the second transceiver and the shared antenna.

16. An insertable wireless communication device comprising:
an insertable device housing configured to be inserted into a power tool housing of a power tool;
a shared antenna located within the insertable device housing and configured to transmit and receive wireless signals between the insertable wireless communication device and a first remote device and a second remote device;
a first transceiver located within the insertable device housing and configured to communicate, via the shared antenna, with the first remote device using a first type of wireless communication; and
a second transceiver located within the insertable device housing and configured to communicate, via the shared antenna, with the second remote device, using a second type of wireless communication different than the first type of wireless communication.

17. The insertable wireless communication device of claim 16, wherein the first transceiver is configured to transmit, via the shared antenna, a location of the insertable wireless communication device to the first external device without using an intermediary device; and wherein the second transceiver is configured to transmit, via the shared antenna, tool data to the second external device, and the second transceiver is configured to receive, via the shared antenna and from the second external device, a command to control an operation of the power tool.

18. The insertable wireless communication device of claim 17, wherein the command includes at least one of the group consisting of a first command to control a work light of the power tool, a second command to lock the power tool to prevent the power tool from operating, a third command including power tool configuration data to control an operation of a motor of the power tool, and combinations thereof.

19. The insertable wireless communication device of claim 16, further comprising:
a backup power source located within the insertable device housing;
wherein the first transceiver is configured to be powered by a battery pack coupled to the power tool, and the first transceiver is configured to be unpowered when the battery pack is not coupled to the power tool; and
wherein the second transceiver is configured to be powered by the backup power source when the battery pack is not coupled to the power tool.

20. The insertable wireless communication device of claim 16, further comprising:
an electronic processor located within the insertable device housing, the electronic processor connected to the first transceiver and to the second transceiver,
wherein the electronic processor is configured to:
communicate with the first external device using the first transceiver and the shared antenna; and
communicate with the second external device via the second transceiver and the shared antenna.

* * * * *